(12) United States Patent
Sugar et al.

(10) Patent No.: US 7,992,849 B2
(45) Date of Patent: Aug. 9, 2011

(54) ADJUSTABLE STIFFNESS JACK SPRING ACTUATOR

(76) Inventors: Thomas Sugar, Tempe, AZ (US); Kevin Hollander, Phoenix, AZ (US)

( * ) Notice: Subject to any disclaimer, the term of this patent is extended or adjusted under 35 U.S.C. 154(b) by 1018 days.

(21) Appl. No.: 11/575,682

(22) PCT Filed: Sep. 21, 2005

(86) PCT No.: PCT/US2005/033509
§ 371 (c)(1),
(2), (4) Date: Mar. 21, 2007

(87) PCT Pub. No.: WO2006/034210
PCT Pub. Date: Mar. 30, 2006

(65) Prior Publication Data
US 2007/0267791 A1    Nov. 22, 2007

Related U.S. Application Data

(60) Provisional application No. 60/611,996, filed on Sep. 21, 2004.

(51) Int. Cl.
*F16F 1/06* (2006.01)
(52) U.S. Cl. .................... 267/175; 267/177; 267/174

(58) Field of Classification Search .............. 267/177, 267/166, 170, 174, 175, 178
See application file for complete search history.

(56) References Cited

U.S. PATENT DOCUMENTS

| | | | | | |
|---|---|---|---|---|---|
| 973,641 | A | * | 10/1910 | Dysart | 267/177 |
| 1,404,464 | A | * | 1/1922 | Meyer | 267/170 |
| 1,704,472 | A | * | 3/1929 | Grandjean | 267/177 |
| 3,141,660 | A | * | 7/1964 | Clarke et al. | 267/166 |
| 4,529,179 | A | * | 7/1985 | Seyler | 267/177 |
| 4,634,109 | A | * | 1/1987 | Cigolotti et al. | 267/177 |
| 6,676,118 | B2 | | 1/2004 | Chou | |
| 6,681,908 | B2 | | 1/2004 | Davis | |
| 2003/0178758 | A1 | * | 9/2003 | Metelski | 267/166 |

* cited by examiner

*Primary Examiner* — Thomas J Williams
(74) *Attorney, Agent, or Firm* — Connolly Bove Lodge & Hutz LLP

(57) ABSTRACT

The present invention is a mechanical element, commonly referred to as a "Jack Spring" that is based upon the concept of adding and subtracting coils from a spring. In particular, with the method and apparatus of the present invention, by changing the number of coils in a spring, the actual or intrinsic stiffness of the spring is structurally changed. A very simple and practical method is used to adjust the number of coils. The Jack Spring actuator of the present invention is based upon adjusting the effective structure of a spring.

16 Claims, 15 Drawing Sheets

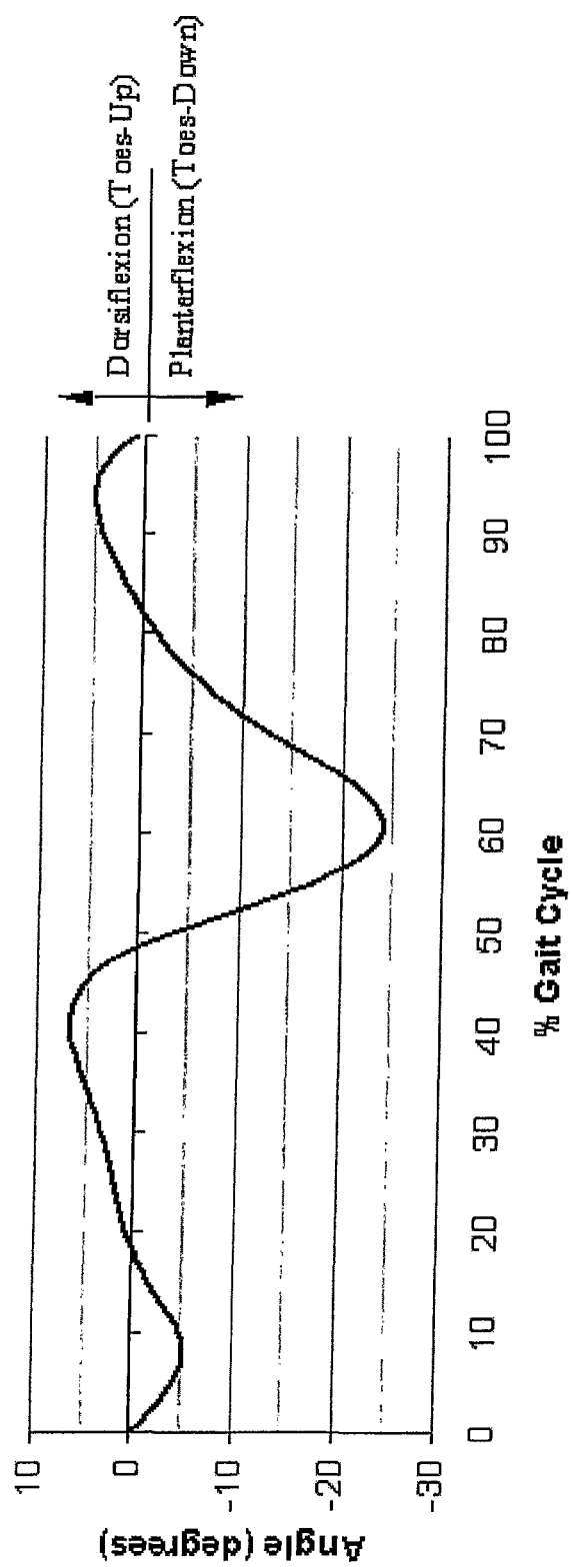
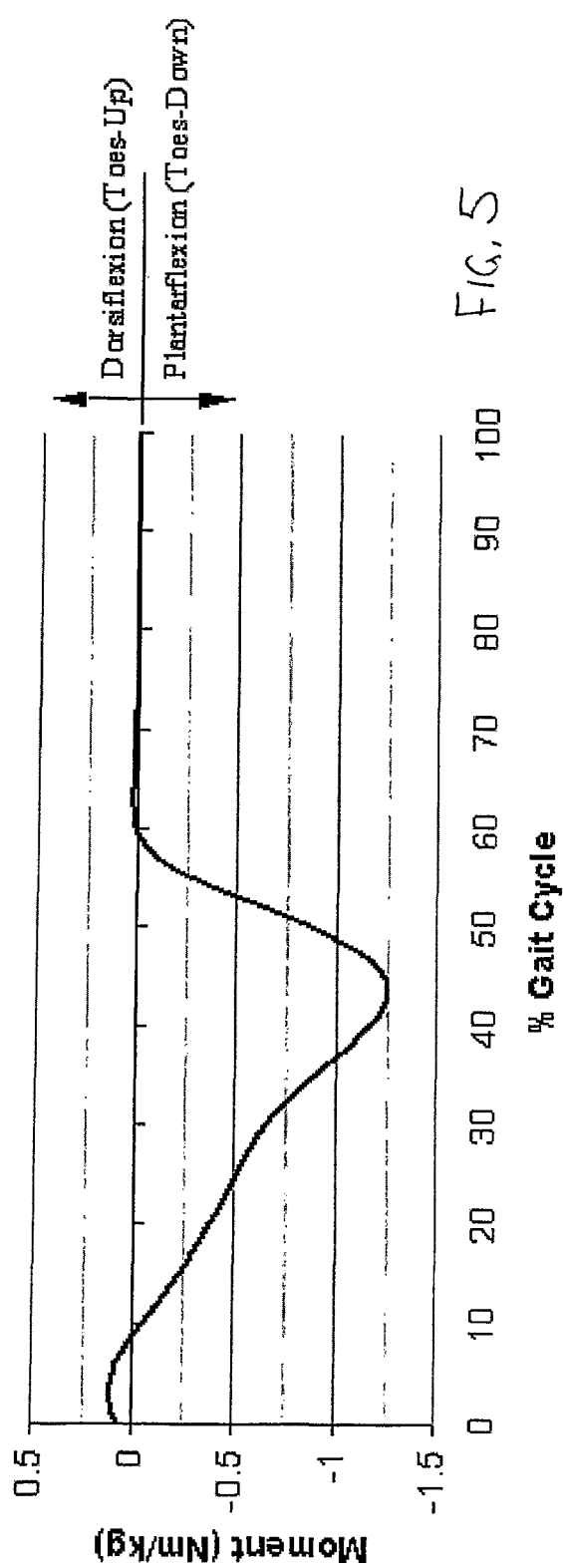
FIG. 5

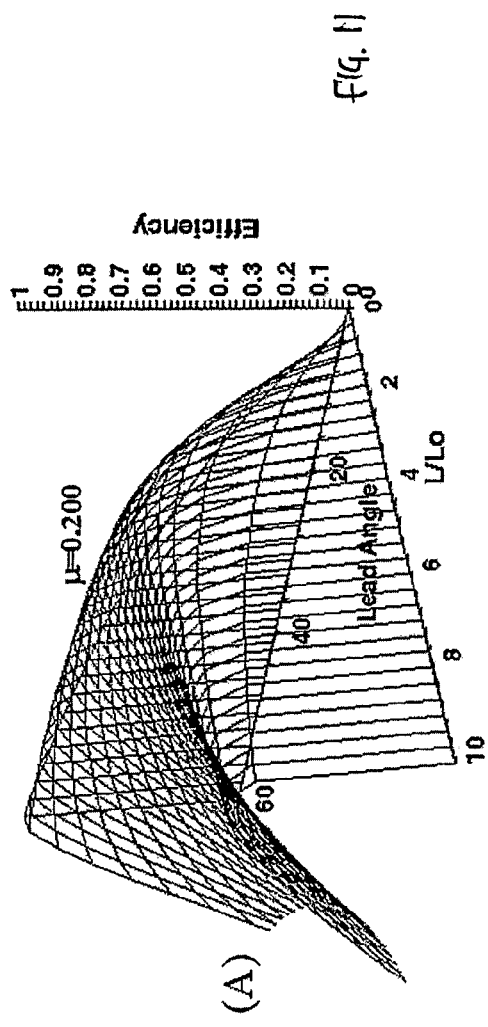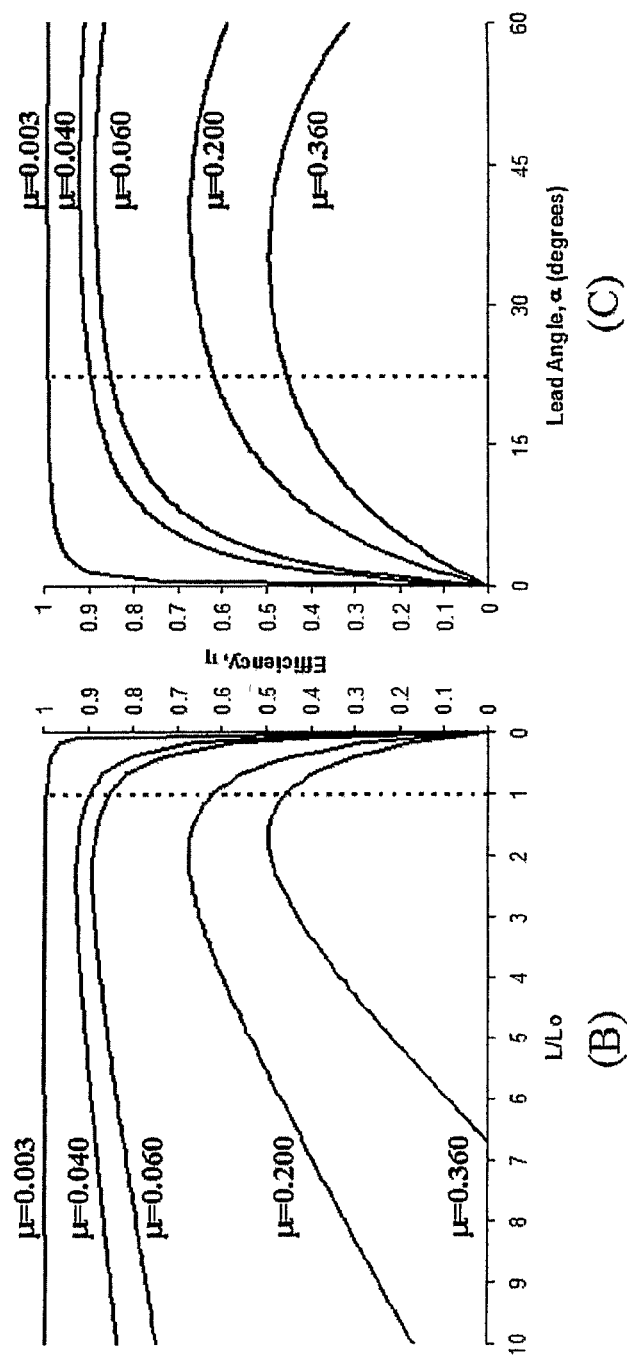

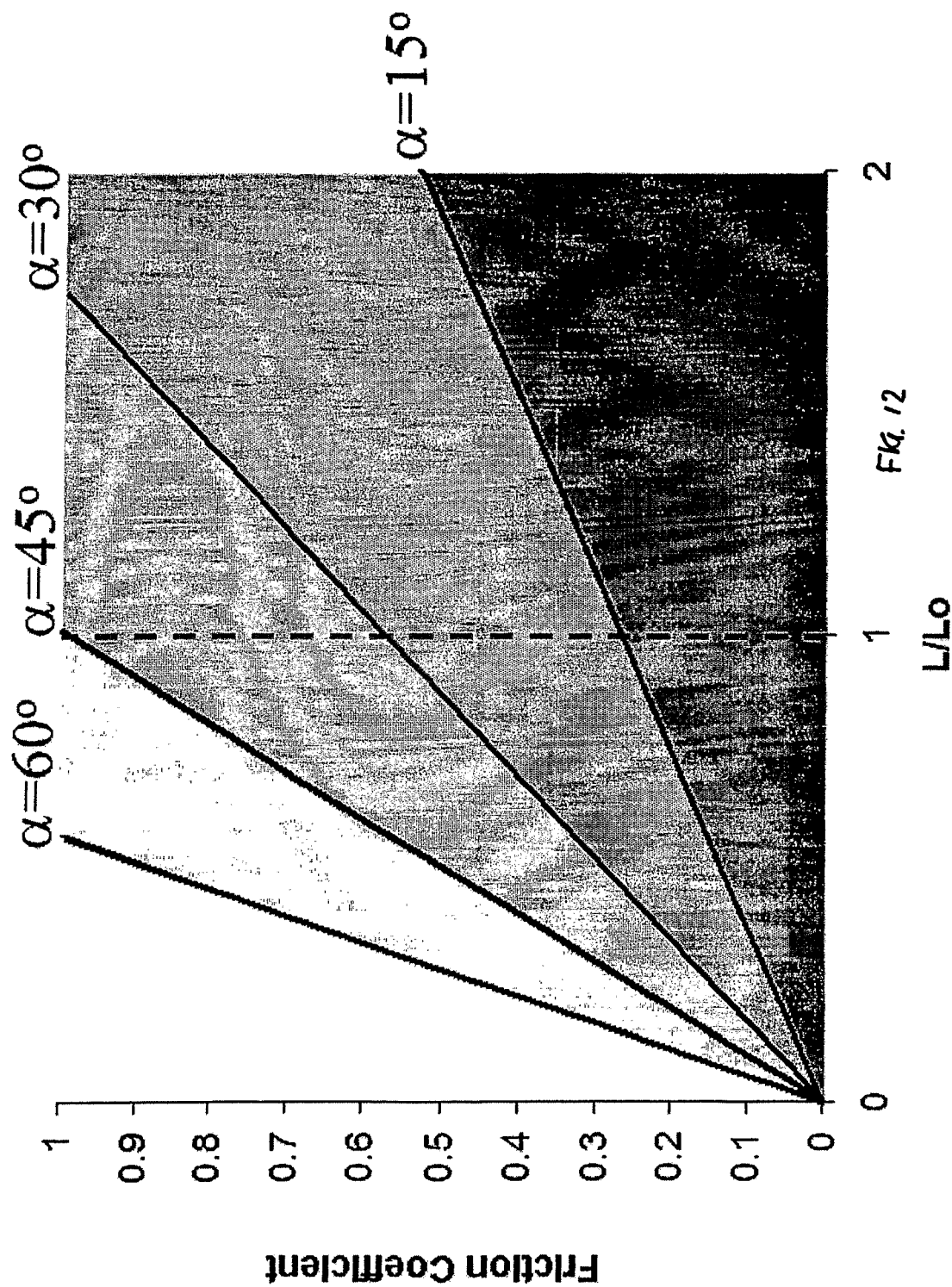

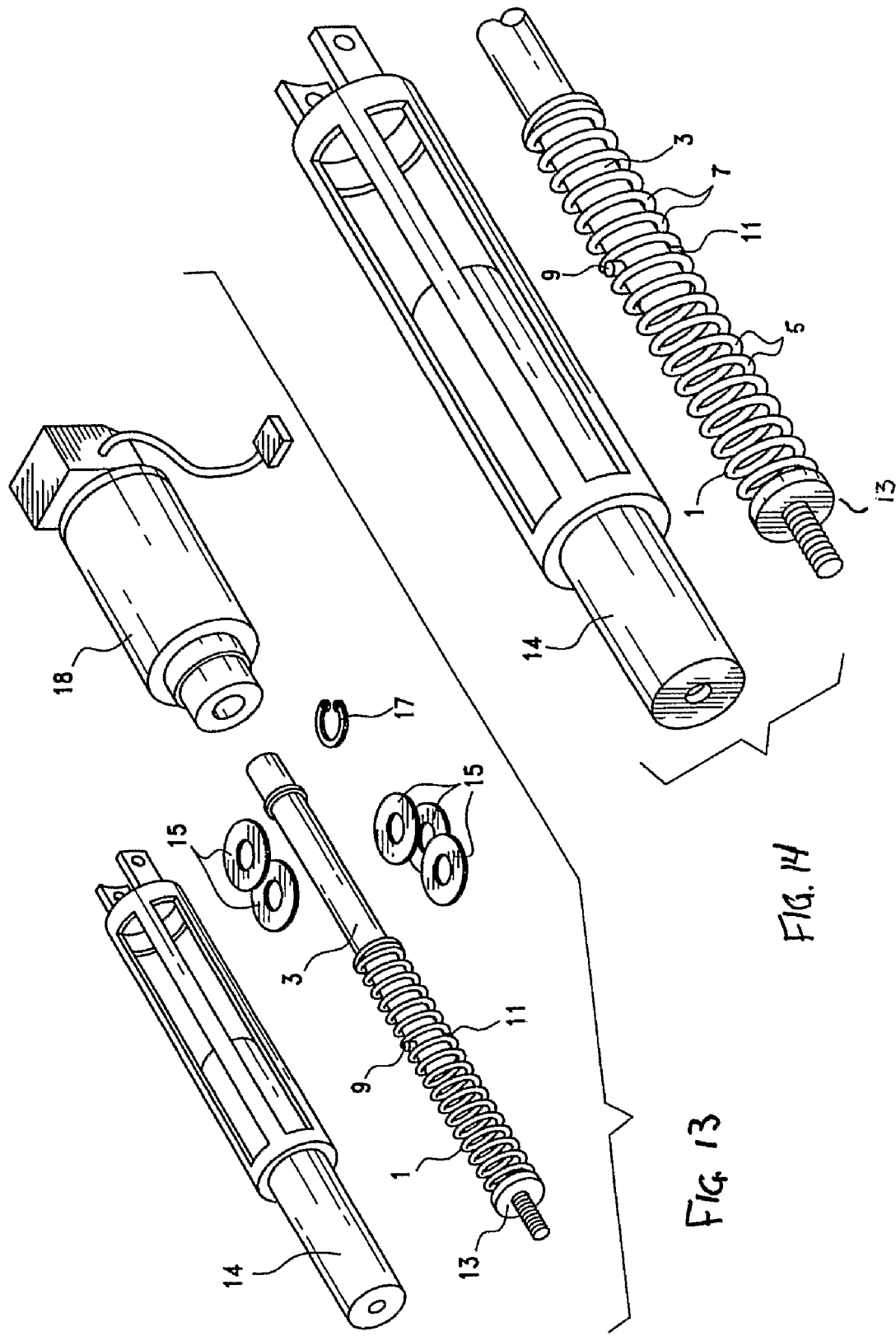

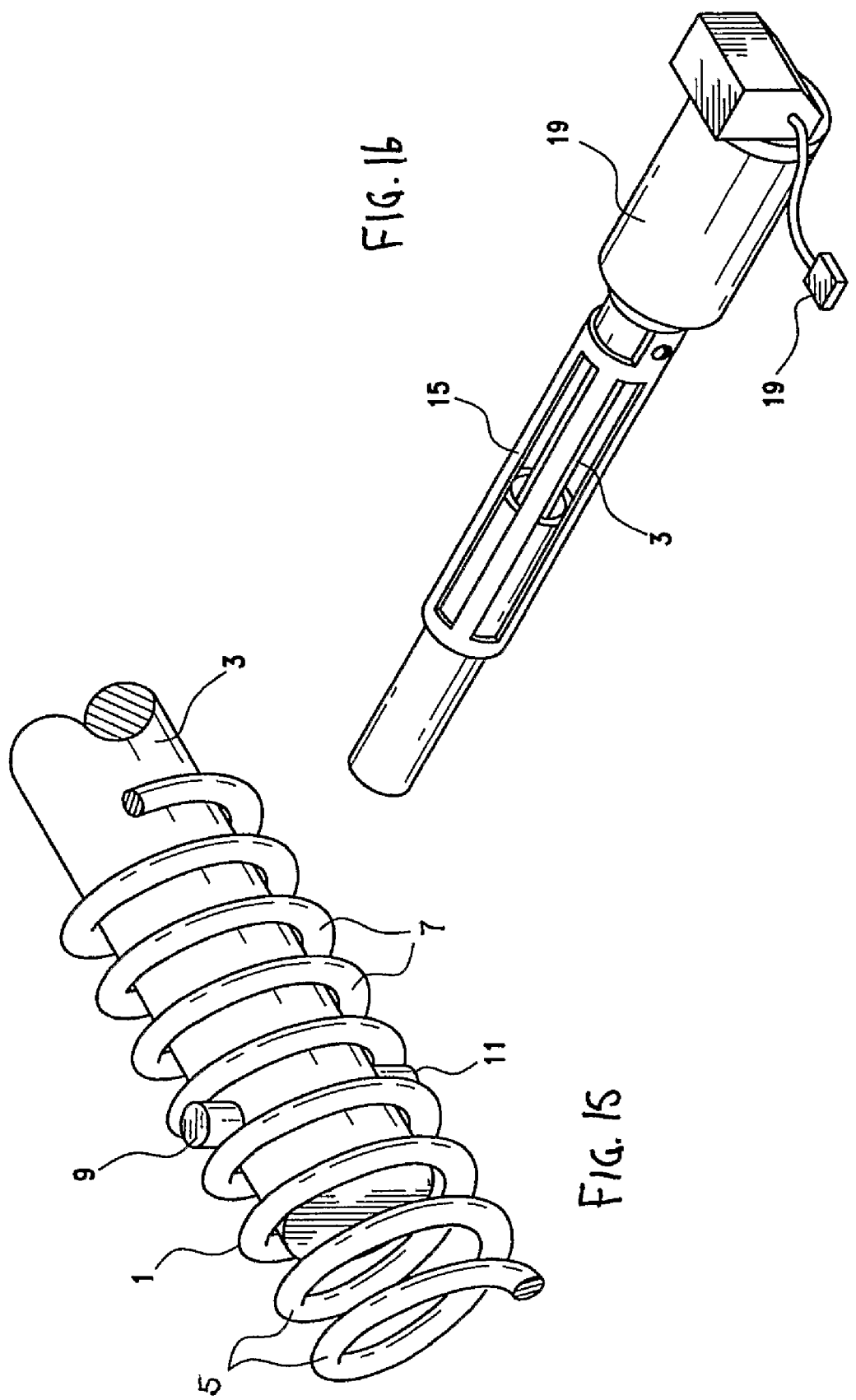

ADJUSTABLE STIFFNESS JACK SPRING ACTUATOR

BACKGROUND OF THE INVENTION

This present invention generally relates to the subject matter of controllable stiffness or compliant actuators that are important in areas such as haptics, vibration damping and wearable robotic systems. In particular, the present invention is an actuator that is useful for "wearable" robotics or exoskeleton systems; can be used to adjust the position, modulate the force or torque applied, and adjust the stiffness properties of a kinematic joint.

BACKGROUND OF THE INVENTION

The intrinsic stiffness of compliant actuators, in particular tunable stiffness, is dynamically adjusted in tunable mechanical devices. The benefit of this approach is the ability to adjust the passive mechanical properties of an actuator using very simple and energy conservative controllers.

In the past two decades increased interest has been devoted to developing 'compliant' robotic systems. Compliance in robotics implies 'give' or 'softness' in what is typically a rigid, linked system. In early industrial robot applications, compliant systems have allowed robots to perform force sensitive tasks (e.g., surface grinding) while remaining stable during their operation. More recently, interest in developing 'wearable' robots or exoskeleton systems has been demonstrated. The typical role of a 'wearable' robotic system is to enhance a person's strength. Compliance in this type of application is imperative to ensure safety for the operator, as the robotic system is not tucked safely away behind a cage, as in a factory floor robot.

The process of interfacing robotics directly onto humans introduces design issues of weight, power consumption and again safety. To meet the challenges laid by these constraints, actuators based upon spring concepts offer a promising solution. Unlike traditional motor approaches, spring based actuators are inherently compliant, energy conservative and lightweight. Through manipulation of an actuator's 'effective' structure, variations in actuator stiffness can be obtained. A 'Force Suit' constructed from these actuators can be created, thus enabling the disabled or weak to regain lost functionality and independence in their everyday lives.

In typical-direct drive examples of background art in this area, a rotary or linear electric motor is often used to change the intrinsic stiffness of a joint by modulating the torque of the electric motor based on a feedback signal measuring the position of the joint. However, limitations of the background art in this area include the need for using electrical energy to constantly modulate the joint stiffness, the difficulty of storing this electrical energy, the low power-to-weight ratios for standard electric motors, and the very high intrinsic stiffness of the motor that ultimately must be lowered for safety reasons when applied in wearable applications. In the field, researchers have developed wearable robots based on heavy direct-drive motors or heavy direct-drive hydraulic systems.

Researchers in this area have used lightweight, powerful artificial muscles based on pneumatics. The disadvantage of these systems is the need for a pressurized air source. Still in another example, researchers have designed series elastic actuators based on a motor, transmission, spring, force sensor, and feedback. The feedback signal is used to modulate the torque of a motor using a complicated control law. Again the disadvantage is the need for a heavy transmission and the reliance on modulating the torque of an inherently stiff motor.

Specific examples of background art in this area are disclosed by U.S. Pat. No. 6,681,908 (Davis) and U.S. Pat. No. 6,676,118 (Chou). In particular, Davis discloses a tuned mass damper (TMD) that is adjustable by utilizing an adjustment screw that is retracted or advanced, changing the number of active coils in a spring that engages a damping mass in a sealed TMD. The adjustment screw changes the spring rate and the natural frequency of the spring-mass combination.

However, the versatility of Davis for actuator applications is limited because the means for adjusting the number of active coils (i.e., the adjustment screw) does not compress, advance, retract or move with a screw motion or translate the spring. By not allowing the spring to compress, advance, retract, or in general move with a screw motion, the spring cannot be used as an actuator where the position of the actuating link can be adjusted. In addition, a further limitation of Davis is that only the adjustment screw moves whereas the spring itself is fixed.

Chou discloses an adjustable casing for a helical spring, such that the helical spring mounted in the adjustable casing can be freely adjusted to a desired modulus of elasticity. In particular, Chou discloses that the characteristics of the helical spring can be changed through changing the number of active coils subjected to a compressing force or a stretching force. However, the versatility of the helical spring disclosed by Chou is limited because the spring is fixedly attached to the casing and the casing can only be adjusted manually. In contrast to Chou, a versatile spring actuator allows the number of coils in the spring to be manually or automatically changed.

Therefore, there is a need in the art for an actuator that requires less power input, less weight and consumes less energy than required by direct drive examples of the background art. Further, there is a need in the art for a class of compliant actuation concepts, referred to as "structure controlled stiffness," that are based upon more versatile means of manipulating the internal structure of an actuator to effect a physical change in device stiffness. Moreover, there is a need in the art for an actuator that can be applied to the development of "wearable" systems that will eventually provide strength augmentation to humans.

BRIEF SUMMARY OF THE INVENTION

The present invention is a mechanical element, commonly referred to as a "Jack Spring" that is based upon the concept of adding and subtracting coils from a spring. In particular, with the method and apparatus of the present invention, by changing the number of coils in a spring, the actual or intrinsic stiffness of the spring is structurally changed. A very simple and practical method is used to adjust the number of coils. The Jack Spring actuator of the present invention is based upon adjusting the effective structure of a spring.

In particular, since the spring of the present invention translates, the Jack Spring actuator can replace any standard linear actuator such as a lead screw, ball screw, pneumatic cylinder, or hydraulic cylinder. In addition, the Jack Spring actuator of the present invention can also be used to apply forces on the environment. Further, by adjusting the guide of the present invention, one can add/subtract to the number of active coils in the spring and increase/decrease the spring compression or increase/decrease the spring tension. A bending example will be disclosed below that allows the Jack Spring actuator to increase/decrease the bending moment. In summary, the Jack Spring actuator of the present invention can adjust the position of a kinematic joint; it can modulate the force or torque applied/resisted to a kinematic joint; and it can adjust the stiffness properties of a kinematic joint.

The Jack Spring is the most general form of a lead screw device. A lead screw device is simply a special case of the Jack Spring, where stiffness (K) is infinite. The Jack Spring concept can be used in many areas of mechanical engineering, such as a haptic feedback joystick or an energy efficient, actively tuned suspension system for an automobile. However, the focus of the present invention is on an actuator and a wearable robot. In the present invention, the Jack Spring is a mechanical device that allows a spring to be used as an actuator.

Some of the advantages of the present invention include, but are not limited to:

stiffness of the actuator can be dynamically tuned;
the spring is the lead screw in the system and thus, it is the speed reducer or gearbox;
the helical spring converts rotary motion into linear motion;
a spring manufacturer can adjust the helical pattern to adjust the lead of the Jack Spring Actuator;
springs have power to weight ratios of approximately 300,000 W/kg versus a DC motor with ratios of approximately 300 W/kg so the actuator is a powerful and lightweight system;
a spring based actuator is able to store and release energy;
the part count is minimal in our design eliminating the need for a gearbox and or lead screw;
a very practical actuator can be designed using off the shelf parts such as a small lightweight DC motor, springs, one rotating transmission rod, a radial bearing, and two thrust bearings;
the actuator can be readily manufactured and assembled in as many variations of helical coiled springs that are available;
local preloading allows local pitch changes to occur (i.e. reduced torque); the lead of the guide mechanism does not have to match the lead of the spring;
the spring can be bent around curvilinear paths allowing for a "bendable lead screw" the bent spring can apply a moment about an axis;
inexpensive method of force measurement, built-in. (Use a position sensor to measure spring deflection which is proportional to force;
inherently compliant and safe; and
eliminates the need for heavy gearboxes.

Generally, in the present invention the spring/transmission rod moves inward and outward in an axial direction on the transmission rod/spring as the spring/transmission rod rotates. More specifically, as the spring moves outwardly, the number of active coils increases and the stiffness decreases. Alternatively, as the spring moves inwardly, the number of active coils decreases and the stiffness increases.

An even more general expression that describes how a spring/transmission rod of the present invention moves is referred to as "screw motion." In particular, if a screw has 0 pitch, then the screw only rotates; if a screw has an infinite pitch, then the screw only translates; and if a screw has a finite pitch, then the screw both rotates and translates at the same time. The amount that the screw rotates or translates is dependent on the pitch value. The moving elements of the present invention are capable of screw motion. A spring manufacturer can adjust the helical pattern to adjust the lead of the actuator.

Moreover, the behavior of the Jack Spring actuator is similar to a lead screw or jackscrew system. In particular, a lead screw is actually a spring with infinite stiffness. The helical pattern on the lead screw is exactly the same as the helical pattern of a basic coil spring.

More specifically, one embodiment of the present invention is an actuator apparatus, comprising: a spring; a transmission rod inserted within the spring and attached to a surface; and means for guiding. In this embodiment: (1) the spring rotates relative to the transmission rod; (2) the transmission rod is in a fixed position relative to the surface; and (3) the means for guiding moves the spring along an axis of the transmission rod.

Another embodiment of the present invention is an actuator apparatus, comprising: a spring attached to a surface; a transmission rod inserted within the spring; and means for guiding. In this embodiment: (1) the transmission rod rotates relative to the spring; (2) the spring is in a fixed position relative to the surface; and (3) the means for guiding moves the transmission rod along an axis of the spring.

Another embodiment of the present invention is an actuator apparatus, comprising: a spring; a transmission rod inserted within the spring and rotatably attached to a surface; and means for guiding. In this embodiment: (1) the spring translates relative to the surface, (2) the transmission rod rotates relative to the spring, and (3) the means for guiding moves the spring along an axis of the transmission rod.

Yet another embodiment of the present invention is an actuator apparatus, comprising: a spring rotatably attached to a surface; a transmission rod inserted within the spring; and means for guiding. In this embodiment: (1) the transmission rod translates relative to the surface; (2) the spring rotates relative to the transmission rod; and (3) the means for guiding moves the transmission rod along an axis of the spring.

Yet another embodiment of the present invention is an actuator apparatus, comprising: a spring; a transmission rod inserted within the spring and rotatably attached to a surface; and means for guiding. In this embodiment (1) the spring rotates in one direction relative to the transmission rod; (2) the transmission rod rotates opposite the one direction relative to the spring; (3) and the means for guiding moves the spring along an axis of the transmission rod.

In yet another embodiment of the present invention is an actuator apparatus, comprising: a spring, a transmission rod inserted within the spring; a motor, releasably attached to the transmission rod; and means for guiding the transmission rod within the spring. In this embodiment: (1) the motor rotates the transmission rod, and (2) the means for guiding moves the spring along an axis of the transmission rod.

In yet another embodiment of the invention is an actuator apparatus, comprising: a hollow transmission rod; a spring inserted within the hollow transmission rod; a motor, releasably attached to the transmission rod; and means for guiding. In this embodiment: (1) the motor rotates the transmission rod, and (2) the means for guiding moves the spring inserted within the hollow transmission rod along an axis of the hollow transmission rod.

In yet another embodiment of the invention is an actuator apparatus comprising: a motor, a means for guiding, and a spring. In this embodiment: (1) the motor rotates the guide, and (2) the means for guiding moves the spring axially inward and outward.

In yet another embodiment of the invention is an actuator apparatus comprising: a motor with a hollow center, a means for guiding, and a spring. In this embodiment: (1) the motor rotates the guide, and (2) the means for guiding moves the spring axially inward and outward through the center of the motor.

In yet another embodiment of the invention is an actuator apparatus comprising: a motor, a means for guiding, and a spring. In this embodiment: (1) the motor rotates the spring, and (2) the means for guiding moves axially inward and outward following the pitch of the spring.

Yet another embodiment of the present invention is an actuator apparatus, comprising: a spring and a means for guiding motion. In this embodiment at least one of the spring and means for guiding at least one of rotate and translate resulting in relative motion that can be described as a general screw motion with either rotation, translation or the combination of both. In addition, preferably the spring can be a general, curvilinear coiled spring with varying intrinsic parameters of coil diameter, wire diameter, shear modulus, and lead. Preferably the means for guiding is mounted on at least one of inside of the spring and outside of the spring. Preferably, spacing for a surface of the means for guiding at least one of matches spacing between coils of the spring and differs from spacing betweens coils of the spring. Preferably, the spacing of the guide surface is adjusted by at least one of manual control or automatic control. Preferably, a non-equal means for guiding and spacing of the coils of the spring decouples a torque and translation relationship.

Further, preferably, the means for guiding is at least one of one or more pins radially protruding from a transmission rod and radially protruding between the coils of the spring; one or more pins radially protruding from a transmission rod and radially protruding between the coils of the spring mounted on bearings to allow for rotation of the pins while in contact with the spring; a manufactured nut inserted inside the spring; a manufactured nut mounted on the outside of the spring; a manufactured nut that uses guiding balls to provide a rolling motion between the spring and the nut; threads cut on the outside of a transmission rod; and threads cut on the inside of a hollow transmission rod.

Furthermore, preferably a duality of self-locking or back-drive behavior can be exhibited. Preferably, the spring can be loaded in at least one of tension, compression, bending, shear and a combination of different loads. Preferably, based on the number of active coils, axial stiffness can be tuned. Preferably, based on the number of active coils, bending stiffness can be tuned. Preferably, individual coils of the spring will be added or subtracted to the active region due to the relative motion between the means for guiding and the spring. Preferably, the actuator apparatus can be used to control the position of a kinematic joint; used to control the force/torque of a kinematic joint; used to modulate the stiffness of a kinematic joint; and used in a wearable actuated system.

Yet another embodiment of the present invention comprises: a spring; a transmission rod; means for guiding. In this embodiment at least one of the spring and means for guiding at least one of rotate and translate resulting in relative motion that can be described as a general screw motion with either rotation, translation or the combination of both. In addition, preferably the transmission rod is made from a drive shaft, hollow tube, or flexible material.

In each of the embodiments discussed above, the spring moves with a general screw motion. Preferably, the spring acts as at least one of a lead screw and a ball screw where the number of active coils is adjusted as the spring moves along the axis of the transmission rod. More specifically the number of active coils (e.g., see FIG. 3 below, to the left of the pins) determines the intrinsic stiffness of the actuator and only the active coils deflect under a load.

Alternative but non-limiting examples of springs include a coil spring, a helical spring, a volute spring, and an exponential spring. The intrinsic parameters of the coil spring which may be varied as a part of the invention include but are not limited to: wire diameter, spring diameter, shear modulus and lead length.

Alternative but non-limiting examples of transmission rods include standard transmission rods, tubes, or flexible drive-transmission rods. In addition, the transmission rod may be inserted within the spring or the transmission rod may be hollow and enclose the spring. The parameters of the transmission rod may also be varied as a part of the invention. In particular, the transmission rod may be, but is not limited to being solid, hollow, rigid, and flexible.

By allowing the spring to be bent in a curvilinear path, an actuator can adjust the position, force or stiffness along an arbitrary path. A flexible transmission rod or motor can rotate a guide mechanism or means for guiding to allow the spring to follow along a curvilinear path. In another example, a flexible transmission rod or motor can rotate the spring causing the guide mechanism or means for guiding to follow along a curvilinear path.

Alternative but non-limiting examples of means for guiding for each of the above embodiments include, but are not limited to: at least one pin radially protruding from the transmission rod inserted within the spring and radially protruding between the coils of the spring; pins mounted in radial bearings allowing the pins to rotate while in contact with the spring; a manufactured nut between the spring and transmission rod; balls configured to provide a rolling motion between the spring and transmission rod similar to a ball screw nut; and threading means cut into the transmission rod that interface with the spring and are configured to move the spring in at least one of an inward and outward direction relative to one end of the transmission rod. Non-limiting examples of threading means is a thread/lip interface between the spring and the transmission rod. These threading means may be cut into either the inside or outside of the transmission rod.

In addition, the means for guiding can be mounted inside the spring or outside of the spring. As a non-limiting example of this concept, a hollow transmission rod could be used and pins could protrude radially inward to guide the transmission rod on the spring. As another non-limiting example, the means for guiding could be a manufactured nut that encases the outside of the spring. Further, the spacing of the manufactured nut may match the spacing between the coils of the spring.

Alternative but non-limiting examples of a motor include rotary and linear type motors. In addition, the parameters of the motor may varied as a part of the invention. Other power sources can be used to translate or rotate the spring/transmission rod. Non-limiting of such power sources include, but are not limited to: a hydraulic cylinder or a pneumatic cylinder.

Alternative but non-limiting examples of types of loading on the actuator include, but are not limited to at least one of tension, compression, bending and shear.

The method and apparatus of the present invention provides many alternative embodiments. One non-limiting example embodiment provided by the present invention is the method of adding or subtracting coils to the spring to adjust the stiffness of the mechanical actuator.

Another non-limiting example embodiment provided by the present invention is that of using a helical pattern for the spring. In choosing the helical pattern, the displacement or "lead" of the screw motion can be varied.

In yet another non-limiting example of an alternative embodiment is selecting a helical pattern that has a large spacing at the beginning of the spring and a small spacing at the end of the spring. As the transmission rod rotates, the velocity of the actuator would be fast at the beginning and slow at the end.

Yet another non-limiting example of an embodiment of the invention is the choice of the type of spring. One non-limiting example of an alternative type of spring is a volute spring. A volute spring is essentially a spring wound on a cone. As the diameter of the spring changes, the mechanical stiffness is varied. In this example, the transmission rod could be inserted inside the spring and large radial pins could protrude through the largest diameter of the spring ensuring that the transmission rod is guided through the changing cross-section of the spring.

Yet another non-limiting example of an embodiment provided by the present invention is that the Jack Spring acts as a speed reduction unit converting rotary motion into linear motion. Moreover, in one example, a robotic ankle, the Jack Spring functions as at least one of a gearbox, compliant interface, energy storage device; and a safety mechanism.

In yet another embodiment of the present invention, the number of active coils in the spring can be adjusted to tune the overall stiffness of the spring. In a preferred embodiment, an internal nut is inserted inside the spring or an external metal nut encases the outside of the spring. Moreover, as the internal nut is adjusted and threads into the spring, the number of active coils is reduced. In this way, the stiffness of a passive spring can be adjusted.

In any of the above embodiments of the present invention, the spacing between two coils of the spring does not have to match the spacing between the two pins or the "nut". For example, the spacing between the two pins could be smaller, thus flattening and collapsing the coils together in this area. The advantage of this approach is that less of the external force is transmitted to the motor when the coils are flattened and the lead angle is reduced. Alternatively, the spacing between the two pins could be larger than the spring spacing. In the previous embodiment, the larger spacing could keep the nut from moving due to friction. Moreover, a "fixed spring" could have a variable lead in the nut section. That is, the thread on the nut does not have to match the thread spacing on the spring. In addition, the lead is fixed on a traditional lead screw, but is not fixed on a helical spring.

In any of the above embodiments of the present invention a self-locking feature is turned on or off based on the loading condition. In addition, the loading condition is at least one of a tensile load and a compressive load. Further, values of friction above a predetermined friction threshold create a condition of self-locking. Furthermore, values of friction below a predetermined friction threshold create a condition of back driving.

Since the spring is flexible, it can be bent. A bent Jack Spring actuator can be used to adjust an angular position of a kinematic joint, apply a torque to a kinematic joint, or modulate the stiffness of a kinematic joint. For example, if the number of active coils is reduced, the bending stiffness increases.

BRIEF DESCRIPTION OF THE DRAWINGS

FIG. 5 shows angle and moment relationships for a human ankle gait;
FIG. 11A shows a surface plot for a given coefficient of friction;
FIG. 11B shows a cross sectional slice of FIG. 11a at various coefficients of friction and a constant lead angle $\alpha_0=22.5$ degrees;
FIG. 11C shows a cross-sectional slice of FIG. 11A when $l/l_0$ equals 1 at various coefficients of friction;
FIG. 12 shows Jack Spring Self-Locking Condition where the various shaded regions indicate that the system will back drive
FIG. 13 shows an exploded view of an exemplary embodiment of Jack Spring actuator apparatus prototype;
FIG. 14 shows the spring/transmission rod interface of the prototype;
FIG. 15 shows a close-up view of the spring/transmission rod interface of the present invention;
FIG. 16 shows the assembled Jack Spring actuator prototype.

DETAILED DESCRIPTION

The Jack Spring of the present invention is a mechanical element that is based upon the concept of structure-controlled stiffness. The structure of the Jack Spring is dynamically changed to tune the mechanical system. A basic Jack Spring mechanism can be described as a helical or coil spring that can adjust its number of active coils and translate in an inward or outward motion. The use of such a Jack Spring mechanism is comparable to that of a linear screw. The difference between the Jack Spring and the linear screw concept is that the lead for a Jack Spring is variable based upon an imposed axial force.

Figure 1:
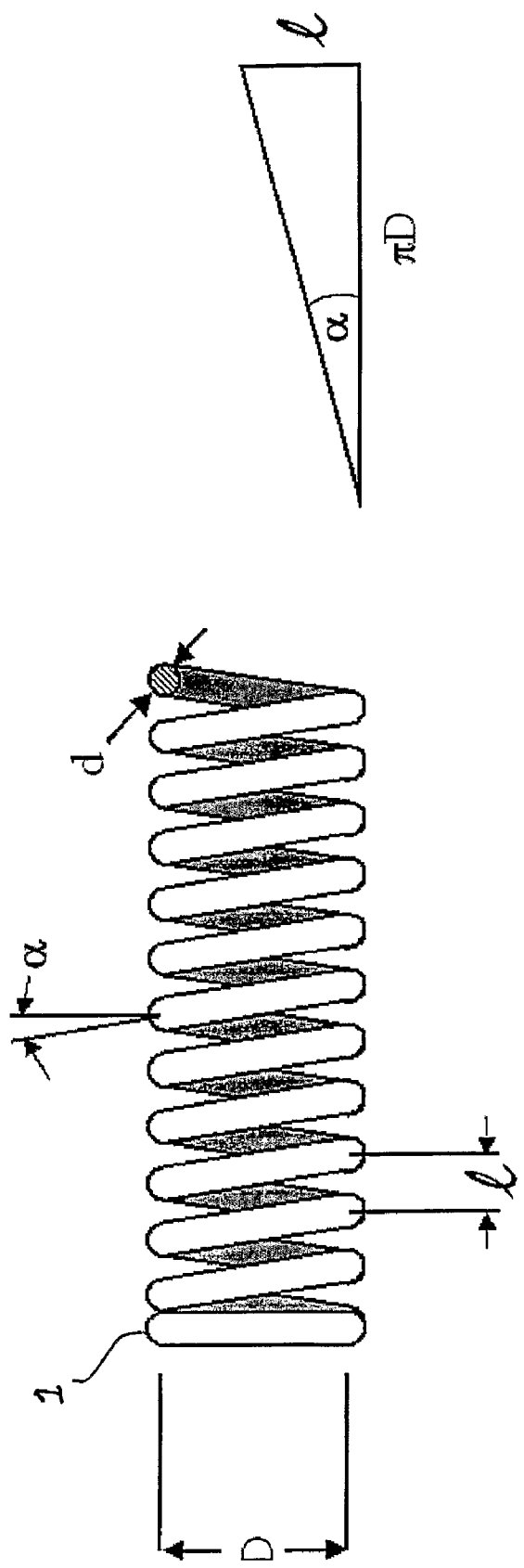
FIG. 1 shows a helical spring geometry.

To further explain the concepts of the present invention, the geometry of a helical spring is shown in FIG. 1. The parameters of a helical spring 1 are the coil diameter, D, wire diameter, d, lead angle, $\alpha$, and lead, l. Another parameter related to the performance of an actuator spring is the number of coils, $n_a$. Along with material properties, such as shear modulus G, the parameters of the number of active coils, $n_a$, the coil diameter, D, and the wire diameter, d, drive the stiffness of a spring 1. This relationship is shown in equation (1) as:

$$K = \frac{Gd^4}{8D^3 n_a}. \tag{1}$$

Each of the parameters of equation (1) influences the stiffness of a coiled spring. In particular, an increase in wire diameter, d, will increase stiffness. Alternatively, either an increase in coil diameter, D, or number of active coils, $n_a$, will decrease spring stiffness. To create a structure-controlled stiffness device, based upon the properties of a coil spring, any of the above-discussed parameters could potentially be adjusted. In the Jack Spring concept, the numbers of active coils, $n_a$, are adjusted to vary the stiffness.

Figure 2:
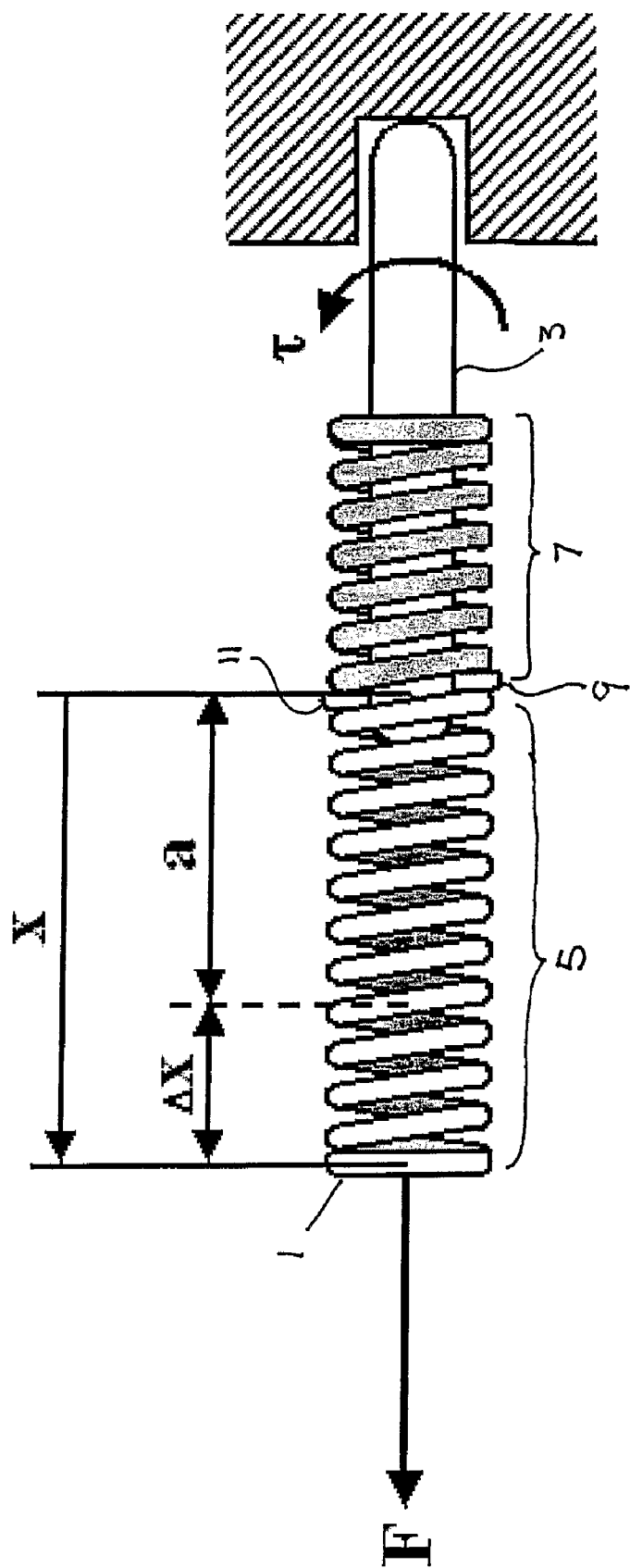
FIG. 2 is an exemplary drawing showing a conceptual diagram of utilizing this Jack Spring.

FIG. 2 shows a conceptual diagram of utilizing this Jack Spring. In particular, FIG. 2 shows an extending helical spring or Jack Spring 1. Through a clockwise or counter-clockwise rotation τ of either the spring 1, the transmission rod 3, or an internal nut (not shown), coils of the spring 1 can be added to or subtracted from the number of active coils 5. Adding or subtracting from the number of active coils changes the effective stiffness of the actuator structure. In this example, both displacement and stiffness are coupled.

Figure 3:
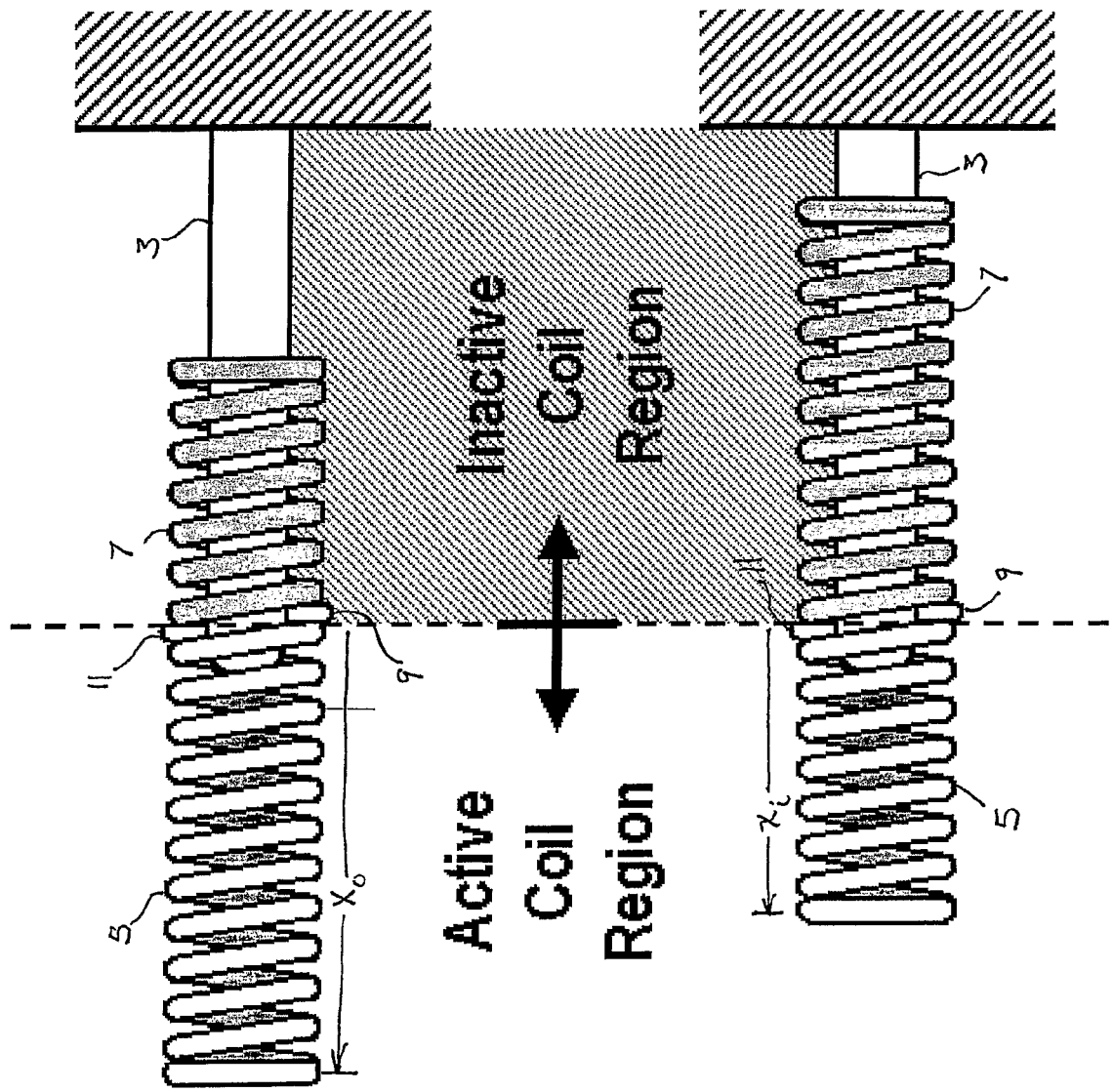
FIG. 3 is an exemplary drawing showing the number of active coils and a number of inactive coils.

FIG. 3 is an exemplary drawing showing the number of active coils and a number of inactive coils. In particular, the top portion of FIG. 3 shows that as transmission rod 3 rotates in one direction τ, the spring 1 is translated outwardly increasing the displacement, $x_o$. In addition, FIG. 3 shows as the spring is translated outwardly, the number of coils $n_a$ in the active region 5 increases, the number of coils $n_i$ in the inactive region 7 decreases and the stiffness of the actuator structure decreases.

Alternatively, the bottom portion of FIG. 3 shows that as transmission rod 3 rotates in the reverse direction −τ, the spring 1 is translated inwardly decreasing the displacement, $x_i$. In addition, FIG. 3 shows as the spring is translated inwardly, the number of coils $n_a$ in the active region 5 decreases, the number of coils $n_i$ in the inactive region 7 increases and the stiffness of the actuator structure increases.

The Jack Spring mechanism of the present invention has many potential applications. As further detailed below, the present invention will be used to create a compliant wearable actuator. The numerous applications of the Jack Spring actuator of the present invention is limited only by the imagination of a designer who chooses to use it. As discussed above, the Jack Spring mechanism of the present invention can be dynamically re-tuned to meet ever-changing stiffness requirements.

As an actuator, the Jack Spring of the present invention offers a combination of: (1) compliance, (2) energy storage to its actuation tasks, and (3) the ability to adjust its position. In particular, these are desirable attributes for a wearable robot. In addition, the present invention can act like a lead screw system, with a very lightweight gearbox built-in.

Further, with measurement of the number of active coils, $n_a$, and end effector displacement x, force sensing is easily obtained. The force is proportional to the deflection in the number of active coils $n_a$. These relationships can be used to provide three different choices of actuator control; 1) end effector position control, 2) end effector 'equilibrium' position control, and 3) end effector force control. The "end effector" is defined as the end of the spring that interacts with the environment.

The end effector position control of item 1) can be obtained by adjusting the actuator solely on the basis of the end effector displacement position, x. The equilibrium position control of item 2) can be obtained by adjusting the actuator solely on the position of the free length of the spring, which changes based upon the value of $n_a$. Finally, the effector force control of item 3) can be obtained by adjusting the actuator based upon both values of end effector position displacement position x, and $n_a$, which together are used to calculate force, F in equations that further describe the present invention and which are defined below.

In addition, the ability to adjust position and stiffness of the spring can allow the unit to include properties of energy storage (e.g., loading the spring) or energy dissipation. In particular, energy dissipation is achieved by allowing the spring to absorb a load and then by driving the spring backwards, it is not able to return the stored energy back to the environment. The ability to control energy dissipation is very important in "hopping robots."

Figure 4:
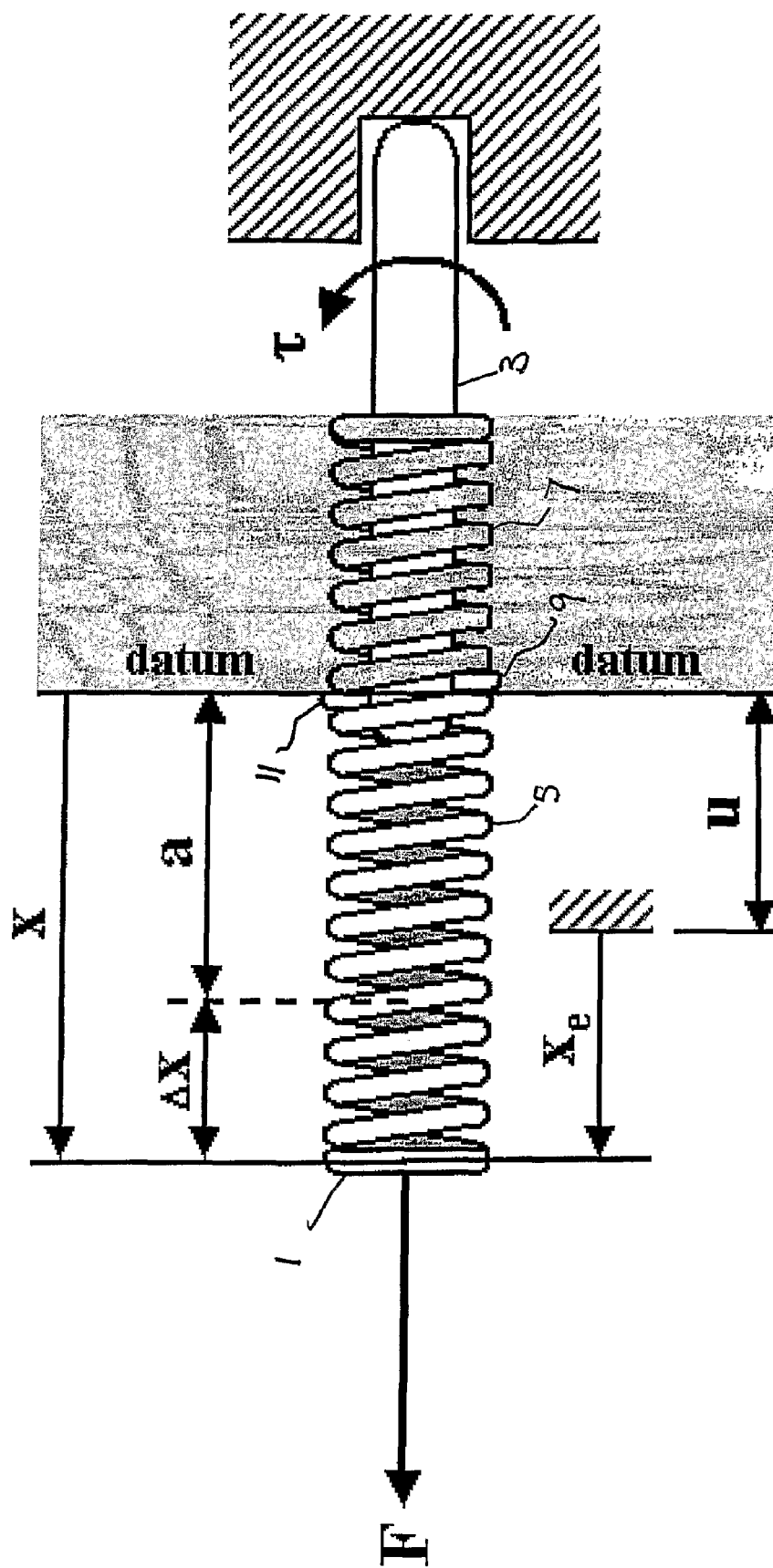
FIG. 4 is an exemplary block diagram of the Jack Spring Actuator of the present invention.

FIG. 4 is an exemplary diagram of the Jack Spring Actuator of the present invention. In FIG. 4, the end effector position is described by x and the free length of the active portion of the spring is described by a. The term Δx represents the spring deflection; F is the applied force and τ describes the resulting torque or required motor torque. In addition, the referenced environmental position, $x_e$, for convenience is offset from the actuator datum by the variable u. The variable u sets the initial stiffness of the system, and the initial stiffness is very important in the design. Treating the Jack Spring system in terms of a lead screw, we can conclude that required motor torque is represented by equation (2) for an ideal system as:

$$\tau = F\frac{D}{2}\tan(\alpha). \tag{2}$$

D represents the coil diameter, and the lead angle is represented by α, as shown in FIG. 4. Also from FIG. 4, lead, l, can be represented in terms of D and α as:

$$l = \pi D \tan(\alpha). \tag{3}$$

Combining equation (2), equation (3), motor torque, τ, in terms of lead, l is given.

$$\tau = \frac{Fl}{2\pi} \tag{4}$$

Equation (2) through equation (4) are each valid for any lead screw type system. The difference between a lead screw system and the Jack Spring is that for the Jack Spring the lead, l, is variable depending on force. Therefore, deflection of the spring must be considered. For the Jack Spring system, two quantities are measured; end effector displacement position, x and number of active coils, $n_a$ to determine the lead. The lead for this variable pitch screw is simply the end effector position, x, divided by the number of active coils, $n_a$, as given in equation (5) as:

$$l = \frac{x}{n_a}, \tag{5}$$

and at x=a, $l_o$=a/$n_a$. From equation (3), if the lead changes depending on load then the lead angle alpha changes as well.

Now consider the equation of force in a simple spring:

$$F = K\Delta x. \tag{6}$$

From equation (1), we know that K is the result of spring geometry, material, and the number of active coils. If the number of active coils, $n_a$, were the only variable parameter, then the remainder of the equation could be considered as constant and thus equation (1) could be represented by the following equation (7):

$$K = \frac{\beta}{n_a}, \tag{7}$$

and from FIG. 4, we know the following relationship between x, a and Δx, $$x = a + \Delta x, \tag{8}$$

or in terms of $\Delta x$, $$\Delta x = x - a, \tag{9}$$

where $a = n_a * l_o$. Thus substituting these results into equation (6) and simplifying yields:

$$F = \beta\left(\frac{x}{n_a} - l_o\right), \tag{10}$$

and finally, $$F = \beta(l - l_o). \tag{11}$$

From equation (11), the force on the actuator is determined by multiplying the spring constant, $\beta$, by the difference of measured lead, $l$, from the free lead length, $l_o$. Taking this value and substituting it back into equation 4 yields:

$$\tau = \frac{\beta}{2\pi}(l^2 - l_0 * l). \tag{12}$$

Therefore, knowledge of the original free lead length, $l_o$, measured lead, $l = x/n_a$ and spring constant, $\beta$, is all that is necessary to determine both the force, F, on the system and the required motor torque, $\tau$.

For a Jack Spring system, rather than consider a spring's overall stiffness or free length, the single coil stiffness and free lead length become parameters of interest. Again from equation (5), knowing the number of active coils, $n_a$, and the environment's actual position, x, a measure of lead, $l$, is easily determined.

From FIG. 4 we know the basic variables of the Jack Spring actuator of the present invention. Input power to a spring actuator system can be different from its resulting output power. The reason is that a spring can store energy over a significant period of time, but can still release that energy very quickly. Thus, high output power is possible using input from a low power motor.

For the Jack Spring of the present invention, each revolution of the transmission rod or spring is equivalent to the addition or subtraction of a single active spring coil. The transmission rod or spring may be rotated manually or by a motor or some other power source. The relationship between the transmission rod/spring rotation and the Jack Spring is the foundation for determining how much power is delivered to this robotic spring mechanism. From FIG. 4, consider that overall measured position x is equivalent to the following set of relations:

$$x = x_e + u = \Delta x + a \tag{13}$$

Substituting in for $\Delta x$ and a, yields:

$$x = x_e + u = F \cdot (n_a/\beta) + l_o \cdot n_a \tag{14}$$

Solving equation (14) for $n_a$, yields the relationship between number of active coils and environmental position, $x_e$, gives:

$$n_a = \beta \cdot (x_e + u)/(F + \beta l_o). \tag{15}$$

As discussed above, the number of active coils, $n_a$ and motor or manual rotation of the transmission rod/spring are linked. Thus, finding the angular velocity of a motor can be achieved by taking the derivative of equation (15) and multiplying the result by $2\pi$. The derivative of $n_a$ is given by:

$$dn_a/dt = \beta \cdot d/dt[(x_e+u)/(F+\beta l_o)] = \beta \cdot [(\dot{x}_e/(F+\beta lo)) - (x_e + u)/(F+\beta l_o)^2 \cdot \dot{F}] \tag{16}$$

and so, angular velocity, $\omega$, becomes:

$$\omega = 2 \cdot \pi \cdot \beta \cdot [(\dot{x}_e/(F+\beta lo)) - (x_e u)/(F+\beta l_o)^2 \cdot \dot{F}] \tag{17}$$

That is, power of a motor is defined by the motor torque, $\tau$, multiplied by angular velocity, $\omega$. Equation (17) defines angular velocity and equation (12) describes a relationship for motor torque. Converting equation (12) into other Jack Spring relationships, yields the following:

$$\tau = [F/(2 \cdot \pi \cdot \beta)] \cdot [(F+\beta l_o)]. \tag{18}$$

Multiplying equation (18) by equation (17) yields the following relationship for motor power, $P_m$:

$$P_m = \tau \cdot \omega = F \cdot \dot{x}_e - F \cdot \dot{F} \cdot [(x_e+u)/F+\beta l_o)], \tag{19}$$

and where Jack Spring stiffness, K, is described by:

$$K = (F+\beta l_o)/(x_e+u). \tag{20}$$

Combining equation (20) with equation (19), yields the following:

$$P_m = |F \cdot \dot{x}_e - (F \cdot \dot{F})/K|, \tag{21}$$

where $F \cdot \dot{x}_e$ is gait power and $(F \cdot \dot{F})/K$ Jack Spring power.

Notice the addition of absolute value to equation (21). The reason for this is, that regardless of a motor's power contribution to the system (positive or negative), power used by the motor is always positive. If K is treated as infinite, then the Jack Spring model can describe a basic ideal lead screw system as well.

Nevertheless, we are interested in exploring the general nature of a Jack Screw actuator and its coupled stiffness and displacement behavior. Since our interest is ankle gait assistance, then the varying nature of stiffness, K, is as a result of the forces, F and displacements, $x_e$ of a gait cycle, the intrinsic properties of a spring, $\beta l_o$, and the actuator's offset variable, u. For a Jack Spring actuator only $\beta l_o$ and u are available to manipulate the power performance of the system.

Given the above information, it is easy to understand why the intrinsic properties of a spring, $\beta l_o$, play a part in the power performance, but not as easy to understand is why a variable like offset, u, has any significance. The explicit definition of the offset variable, u, has an implicit influence on the beginning or initial stiffness of the system. The system's initial stiffness is an assumed quantity and ultimately influences the power requirements of the motor. To appropriately design the Jack Spring actuator of the present invention and minimize input power requirements from the drive motor, an optimization considering both intrinsic spring properties and initial system stiffness is desirable.

The intrinsic spring property, $\beta l_o$, simultaneously captures a spring's stiffness characteristics and its undeflected lead length. For a Jack Spring, it is the combined nature of these two properties that is important. Remember, $\beta$, is the stiffness of a single spring coil and $l_o$ is the lead length of a single undeflected spring coil. Thus, the intrinsic character of any coil spring can be broken down into a single coil basis. For a Jack Spring, individual coils are continuously being added or subtracted to the active portion of the mechanism and so the intrinsic properties of a single coil must be important. From a practical note, the intrinsic property $\beta l_o$ can easily be determined from a manufacturer's catalog by multiplying a spring's stiffness by its overall free length. This relationship is shown by:

$$K_a = \beta/n_a \cdot (n_a \cdot l_o) = \beta \cdot l_o \tag{22}$$

As mentioned above, the selection of the offset variable, u, implicitly assumes an initial stiffness, K', for the Jack Spring. The relationship between initial stiffness and offset can be seen as:

$$u=1/K'[F(t=0)+\beta l_o]-x_e(t=0) \quad (23)$$

Using equations (21), (22) and (23), an optimization routine was created to seek the lowest peak power over an ankle gait cycle. The routine incrementally changed offset variable u and intrinsic spring property $\beta l_o$ while computing power throughout a cycle. Simultaneous optimization of both $\beta l_o$ and u is not possible. Thus, either $\beta l_o$ or u must be assumed so that the remaining term can then be optimized. As an example, if a spring with $\beta l_o$=1300N (i.e. K=18,000 N/m & a=0.072 m) is used, then values of offset u can be determined for various assumptions of body weight.

Table 2 describes the results of this example. For clarity, K' represents the initial stiffness of the Jack Spring and is implicitly determined by the offset variable, u. The results for the offset optimization show, that a small 5 cm change in the variable u, can result in an optimized performance over an 80 kg range of body mass. This means that the same Jack Spring actuator can be easily adjusted to be re-optimized for large changes in gait load (i.e. body mass). Either the same actuator can be used to support a variety of people or it can be re-tuned to support the same person with added weight on his back. Of special mention, is that by a simple adjustment of offset, optimized input power requirements remain about ⅓ of those produced as output by the Jack Spring actuator.

TABLE 2

Example Jack Spring Optimization: where $\beta l_O$ = 1300N possible.

| Body Mass (kg) | Offset u (m) | K' initial (N/m) | Motor peak (W) | Output peak (W) |
| --- | --- | --- | --- | --- |
| 60 | 0.117 | 10,733 | 60.5 | 185.3 |
| 80 | 0.096 | 12,963 | 81.5 | 247.1 |
| 100 | 0.083 | 14,795 | 102.9 | 308.8 |
| 120 | 0.074 | 16,278 | 124.8 | 370.6 |
| 140 | 0.069 | 17,505 | 147.0 | 432.4 |

In order to understand the significance of reducing required power by ⅓, a comparison of the adjustable Jack Spring actuator to that of an equivalent direct drive system shall be described. However, in order to compare each, some assumptions about the human operator and device must be made. For this analysis, consider a 80 kg person, who has a walking rate of 0.8 Hz. Also consider that the lever arm necessary to convert the rotational ankle joint characteristics to linear movements is 12 cm. For the range of rotational displacement in ankle gait (less than 35°), a linear movement approximation is acceptable.

With these assumptions peak power for human gait is nearly 250 W. Consider again, the angle and moment relationships for human ankle gait, as shown in FIG. 5. From these figures it can be seen that the highest moments and highest velocities occur at approximately 50% of the gait cycle. Although the peak power requirement for gait is high, it is only at this magnitude for the instant at which 'push off' is initiated. For the remainder of the gait cycle the power requirements are much more modest.

Figure 6:
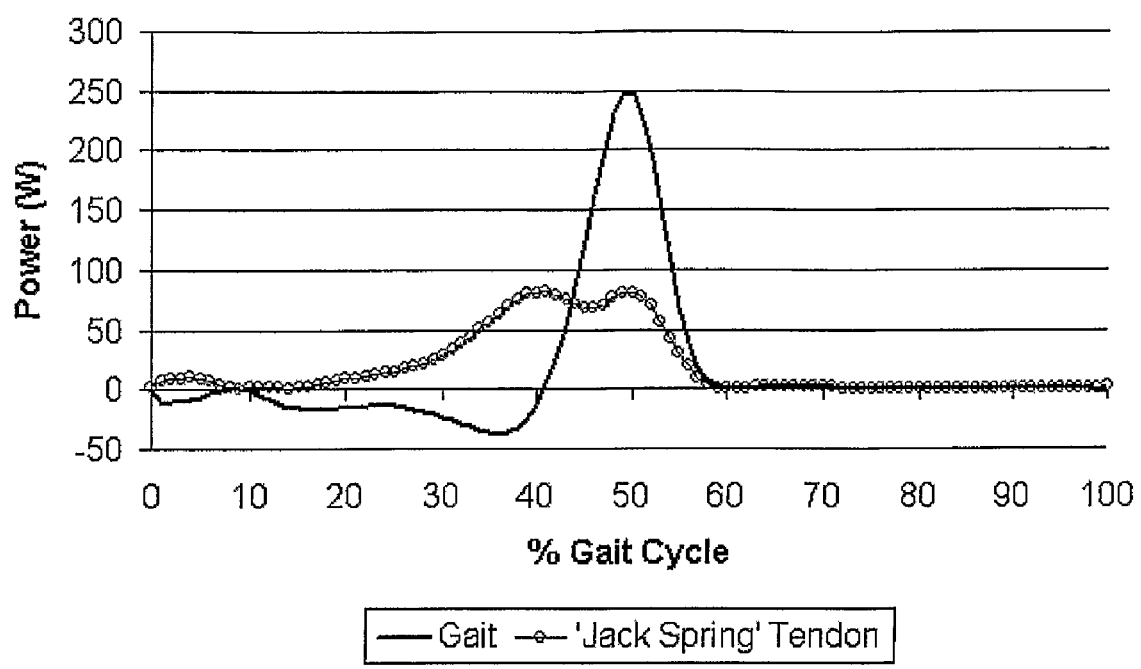
FIG. 6 shows ankle gait power results.

A peak power requirement of 250 W for human gait is not easily accomplished given the constraints for a desirable wearable robot design. In the case of a direct drive solution, a motor of significant size and weight is necessary to provide the full 250 W required. As an example, the Maxon motor RE75 (Maxon Precision Motors, Inc., San Diego, Calif.) is rated for 250 W continuous power (rated peak power, 393 W) and weighs 2.8 kg not including a gearbox. Adding an appropriate gearbox to match ankle torque requirements increases the weight by 3.8 kg. The combined 6.6 kg is not a small amount of weight to add to a person's ankle. In contrast, the above described Jack Spring actuator can provide the same 250 W of power necessary for gait, but can use a DC motor sized for less than 90 W power, as shown in FIG. 6. In particular, FIG. 6 shows ankle gait power results where output power is shown as the thick solid line and input power is shown as the thin line with circles. The Maxon RE35 is a 90 W rated (continuous) motor, which weighs only 0.34 kg, that is 8 times less weight then the afore mentioned Maxon RE75 motor. Since the Jack Spring mechanism is its own gearbox, a standard gear assembly is not required. Using weight estimations based upon the original prototype, the Jack Spring mechanism for this application will likely weigh about 0.5 kg. Thus the anticipated combined weight for the Jack Spring actuator is approximately 0.84 kg, 8 times less than the direct drive solution. An eight fold savings in weight is a significant achievement for a wearable robot design.

Figure 7:
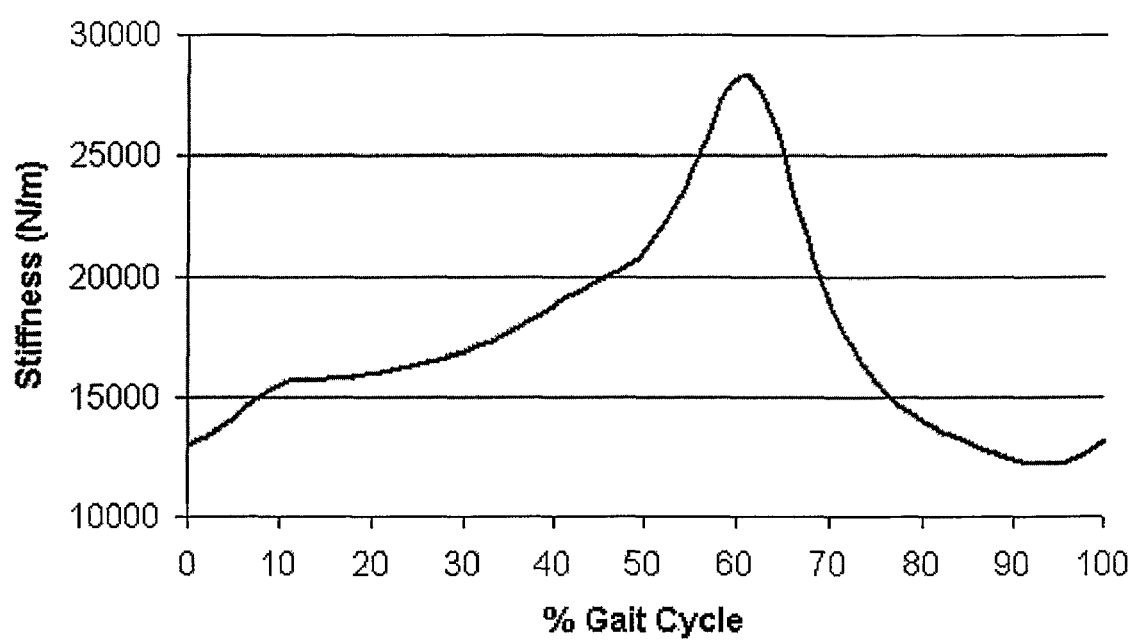
FIG. 7 is a Jack Spring Stiffness Profile through a Gait Cycle.
Figure 8:
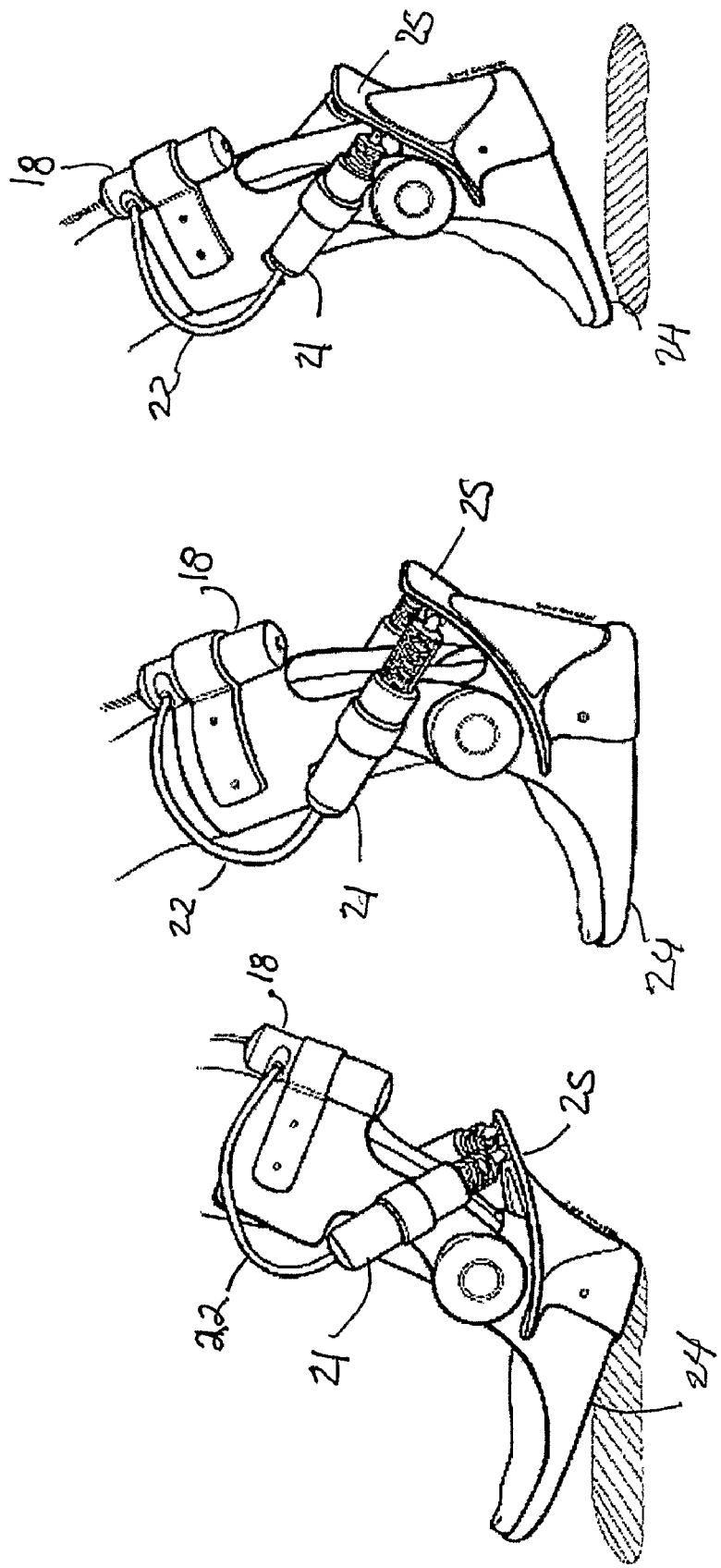
FIG. 8 is an exemplary embodiment of the present invention illustrating how a Jack Spring actuator apparatus may be implemented in an ankle gait robot.

As mentioned above, the Jack Spring actuator is coupled in stiffness and displacement. To see how stiffness must change through a gait cycle and provide the appropriate angles/moments necessary for normal gait as shown in FIG. 7. In particular, FIG. 7 is a Jack Spring Stiffness Profile through a Gait Cycle. Based upon the described set of assumptions, initial stiffness is shown to be 12,963 N/m and then reaches its maximum value of 28,296 N/m at 60% of the gait cycle, this corresponds to approximately 'toe off.' After reaching that peak, the stiffness is quickly dropped back down to the level of initial stiffness as the device prepares for another 'heel strike.'

During the loading phase of gait (approximately 10% to 40% of a gait cycle) the stiffness of the Jack Spring actuator gradually increases and the spring deflection continues to grow until the peak ankle moment is reached. At this point, 'push off' (roughly 40% to 60% of a gait cycle) begins and the actuator stiffens further, which drives actuator output power to its peak levels, 250 W. This actuator output is the result of using the Jack Spring in a primarily tension mode. Peak ankle moments correspond to peak tensional loads on the actuator. Thus, increasing stiffness throughout this portion of the gait cycle creates a spring that is getting shorter and shorter and hence, driving the plantar flexion position of the ankle to a maximum value.

Lastly, the energy requirements for ankle gait have been computed to be approximately 19 J; this was determined by integrating the power curve shown for gait in FIG. 6. As discussed above, in a direct drive solution, the power required is the absolute value of the gait power curve, and so it's computed energy requirements would be 36 J. This is nearly twice that shown for normal ankle gait.

Therefore, in comparison with a direct drive approach, the Jack Spring shows a significant savings in weight, power and energy, which all result from this novel implementation of a coil spring.

Figure 9:
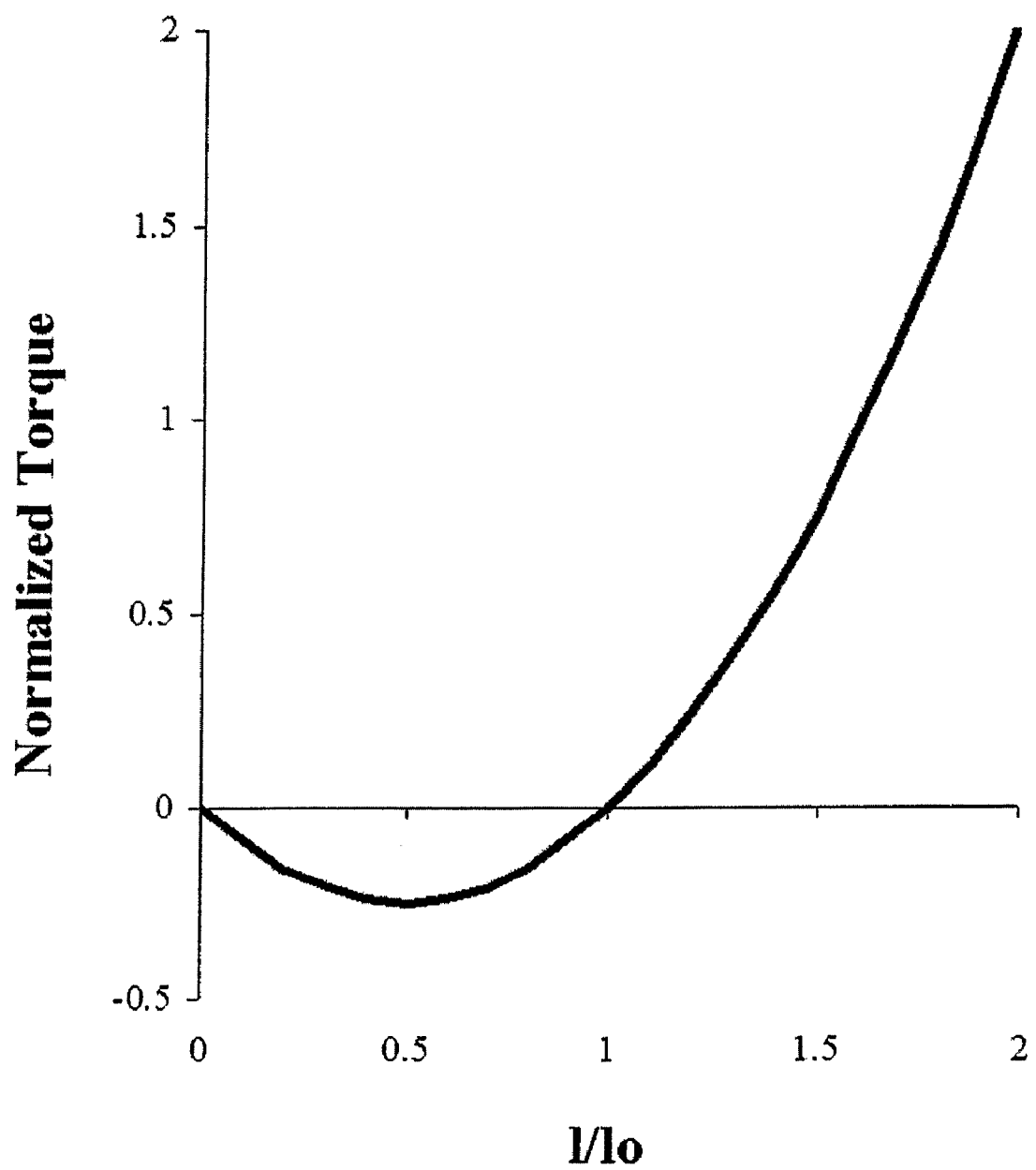
FIG. 9 is an exemplary embodiment of the present invention illustrating how a Jack Spring actuator apparatus may be implemented in an ankle gait robot.

FIG. 9 is an exemplary embodiment of the present invention illustrating how a Jack Spring actuator apparatus may be implemented in an ankle gait robot. In particular, FIG. 9 is an exemplary conceptual design that shows three key features: 1) an actuator 21 manipulating a rigid orthosis 25, 2) a motor 18 attaching to the ankle gait device 24 and attaching to the actuator 21 via a flexible drive transmission rod 22; and 3) the Jack Spring actuator 21 mechanism attaching at an angle to the orthosis 25. As a result of these features, this design configuration is lightweight, can be worn comfortably and will be easy don and doff.

In an alternative embodiment of the present invention, the torsional stiffness of a helical spring is given by equation (24) as:

$$\frac{M}{\theta} = \frac{Ed^4}{64Rn_a(2+\mu)}. \quad (24)$$

M is the resulting moment caused by the bending of helical spring by an amount θ. E is the Young's Modulus of the material, and d is the wire diameter. R is the mean radius of the helix, and $n_a$ is the number of active coils. Lastly, μ is the Poisson ratio of the material. As discussed above, using the Jack Spring Actuator of the present invention, the number of active coils can be increased or decreased. If the number of active coils is decreased, then the torsional stiffness of the bent helical spring is increased. If the number of active coils in increased, then the torsional stiffness of the bent helical spring is decreased. A bending helical spring could actuate a rotary joint.

The above analyses illustrated the basic nature of an ideal (no friction) Jack Spring actuator. To understand the relationship between the required motor torque and the lead, l, equation (12) is rewritten into a different form. The term, $l/l_0$, represents the loading of the spring either in tension or in compression. If l is greater than $l_0$ then the spring is in tension. Likewise, if l is less than $l_0$ then the spring is in compression. The effect of force is captured in the term $l/l_0$. Equation (25) provides that:

$$\tau = \frac{\beta l_0^2}{2\pi}\left[\left(\frac{l}{l_0}\right)^2 - \left(\frac{l}{l_0}\right)\right] \quad (25)$$

If we assume that $\beta(l_0)^2/2\pi$ equals one, then the relationship between torque and normalized force can be shown in FIG. 9. FIG. 9 shows a normalized torque of the motor versus the normalized force acting on the actuator. Notice, at a value of $l/l_0$ equal to zero, the required torque is zero. This implies that as the coils of the spring are flattened to zero, then the required torque equals zero. At a value of $l/l_0$ equal to one, the torque also equals zero. At this value, there is no applied force on the actuator and thus no motor torque is required.

Using a similar analysis, the effects of friction can now be considered. The friction between the guide mechanism and the spring will be included in the analysis. Equation (4) has an additional term based on friction, μ, and lead angle, α. Equation (26) provides that:

$$\tau = \frac{Fl}{2\pi}\frac{(1+\mu\cot\alpha)}{(1-\mu\tan\alpha)} \quad (26)$$

As before, this equation is valid for either a Jack Spring actuator or a basic lead screw system. The second part of the equation is the influence of friction. In the Jack Spring actuator, the lead angle, α, varies due to the load on the actuator.

Equations (3) and (11) are substituted into equation (26) to determine a final equation describing the torque required for the Jack Spring actuator based on the lead, l, the free lead length, $l_0$, friction, μ, the initial slope of the spring, $\alpha_0$, and spring constant, β. Equation (27) provides that:

$$\tau = \frac{\beta l_0^2}{2\pi}\left[\left(\frac{l}{l_0}\right)^2 - \left(\frac{l}{l_0}\right)\right]\left(\frac{l_0}{l}\right)\left[\frac{\frac{l}{l_0}+\mu\cot\alpha_0}{1-\mu\frac{l}{l_0}\tan\alpha_0}\right] \quad (27)$$

Equation (27) provides the motor torque as a function of spring parameters, geometry, and friction. The $\alpha_0$ term represents the initial slope of the spring when the spring is unloaded. Any loading will deform the slope of the spring from its initial value. The term, $l/l_0$, represents the loading of the spring either in tension or in compression.

Figure 10:
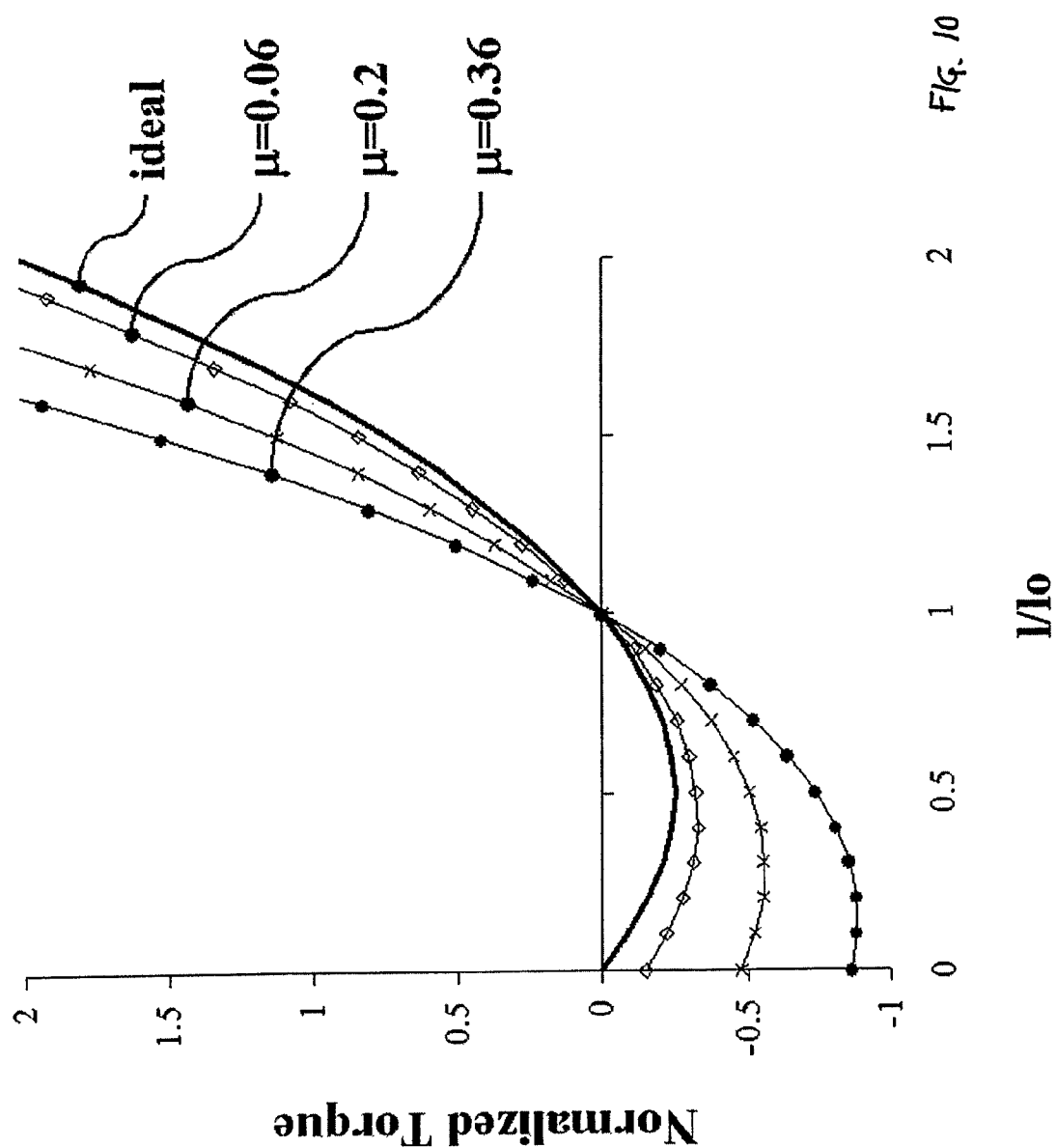
FIG. 10 shows a normalized torque of the motor versus the normalized force acting on the actuator as a function of friction.

If a value for $\alpha_0$ is fixed and equals 22.5 degrees and it is assumed that $\beta(l_0)^2/2\pi$ equals one, then the relationship between torque and normalized force can be shown in FIG. 10 as a function of the friction. FIG. 10 shows a normalized torque of the motor versus the normalized force acting on the actuator as a function of friction.

It should be noted that as the angle, α, decreases, the system becomes less efficient. Once friction has been modeled in the system, an efficiency of the system can be determined. Due to frictional losses, more energy is consumed than can be produced in work. It is very interesting that in the case of the Jack Spring, efficiency is a function of both friction, μ, and the loading, $l/l_0$.

The definition of mechanical efficiency, η, is the ratio of work out of the system to that of the work in.

$$\eta = \frac{Fl}{\tau 2\pi} \quad (28)$$

$$\eta = \left(\frac{l}{l_0}\right)\left[\frac{1-\mu\frac{l}{l_0}\tan\alpha_0}{\frac{l}{l_0}+\mu\cot\alpha_0}\right] \quad (29)$$

From equation (29), the efficiency is dependent on three factors: friction, manufactured lead angle, and the loading. FIG. 11A-FIG. 11C illustrates the complicated nature of equation (29). In particular, FIG. 11A is Jack Spring Efficiency for a 3D surface plot of efficiency with μ=0.2; FIG. 11B is Jack Spring Efficiency versus the load, $\alpha_0$=22.5 degrees; and FIG. 11C is Jack Spring Efficiency versus lead angle, $l/l_0$=1.

FIG. 11A shows a surface plot of equation (29) for a given coefficient of friction, μ=0.2. On one axis the lead angle, $\alpha_0$, varies from 0 to 60 degrees. On the other axis, $l/l_0$ varies from 0 to 10. If efficiency drops below 0, binding occurs and the spring/nut will not rotate.

FIG. 11B shows a cross sectional slice of FIG. 11a at various coefficients of friction and a constant lead angle $\alpha_0$=22.5 degrees. Seen from FIG. 11B is that tensile loads improve efficiency but only to a point. If the tensile loads are too high, then the efficiency drops off.

FIG. 11C shows a cross-sectional slice of FIG. 11A when $l/l_0$ equals 1 at various coefficients of friction. The efficiency varies based on the lead angle and coefficient of friction.

Lastly, similar to lead screws, a self-locking system can be designed. In a self-locking system, the spring/screw system will not back drive. In a lead screw system, the standard self-locking equation is given by:

$$\mu > \tan\alpha \quad (30)$$

However for a Jack Spring, α is dependent on loading. The standard equation can be reformatted in terms of lead, l.

$$\mu > \frac{l}{l_0} \tan \alpha_0 \quad (31)$$

Compared to the basic equation of self-locking given by equation (30), the self locking Jack Spring has some interesting implications. For a basic lead screw system, once manufactured, the system is either self locking or not based on the friction and the lead angle. However, as shown in equation (31), in a Jack Spring system the self-locking feature can be turned on or off based on the loading condition.

FIG. 12 shows the dual self-locking state described above. In particular, FIG. 12 shows Jack Spring Self-Locking Condition where the various shaded regions indicate that the system will back drive.

The dashed vertical line in FIG. 12 represents no load. Values to the right of the dashed line represent tensile loads and values to the left of this line represent compressive loads. FIG. 12 shows a series of slopes based on an initial lead angle of the spring given by $\alpha_0$. Each individual line is the threshold between a self-locking and a back-drivable system. Values of friction chosen above a line create a condition of self-locking for the system and values below the chosen line create a condition of back drive. For example any points below the line for $\alpha_0=15$ degrees line will be back-drivable states for that given system.

Now consider a specific case of $\alpha_0=15$ degrees and a coefficient of friction=0.268. For this system any compressive load will result in a condition of self-locking. However, if a tensile load were applied, then the same Jack Spring would back drive and translate in the direction of the tensile load. This is interesting because the load can determine the state of self-locking.

FIG. 13 shows an exploded view of an exemplary embodiment of Jack Spring actuator apparatus prototype. The actuator apparatus prototype was easily manufactured using off-the-shelf parts and basic machining operations. Thus, the actuator is a very simple, cost-effective device. A Maxon RE40 motor for its high efficiency and its high power-to-weight ratio (300 W/kg) was chosen. In particular, FIG. 13 shows the spring 1, transmission rod 3, pins 9, 11, internal expanding nut 13, external spring cage 14, mounting hardware 15, 17 motor 18 of an actuator prototype. The motor was purchased from Maxon Precision Motors, Inc., San Diego, Calif.; the spring, transmission rod and additional hardware were purchased from McMaster Carr Inc., Los Angeles, Calif.; and the spring a cage was manufactured by a machinist.

FIG. 14 shows the spring/transmission rod interface of the prototype. Looking closely, two pins 9, 11 are attached to transmission rod 3 and can be seen 180° apart and protruding between the active coils 5 and the inactive coils 7 of the spring 1. This spring/transmission rod interface is at the heart of the Jack Spring concept. The internal expanding nut 13 is shown with a threaded end that interfaces with the external spring cage 14 and connects the spring cage to the spring 1.

In the prototype, the pins 9, 11 shown in FIG. 14, provide the means for guiding and may be mounted on a transmission rod 3 made of aluminum and/or via roller bearings (not shown). The means for guiding allows the spring to thread onto the transmission rod similar to a lead screw motion. This configuration can provide a nearly frictionless interface between the pins 9, 11 and the spring 1. As the motor rotates the aluminum transmission rod, the pins roll along the helical path of the spring. The extremely low, rolling friction drives the efficiency of this screw system to well above 90%, analogous to a ball screw system.

FIG. 15 shows a close-up view of the spring/transmission rod interface of the present invention. In particular, FIG. 15, clearly shows pins 9, 11 attached to the transmission rod 3 and protruding from between the number of active coils 5 and the number of inactive coils 7 of the spring 1.

FIG. 16 shows the assembled Jack Spring actuator prototype. In particular, FIG. 16 shows the external spring cage 15, the motor 19, the spring 1, transmission rod 3, pins 9, 11 and power supply input 19 of the Jack Spring actuator prototype.

For a wearable robot, the Jack Spring actuator is an ideal system. The Jack Spring actuator of the present invention embodies many criteria for a good wearable robot actuator. In particular, using the spring as a gearbox creates a system that is very lightweight. Further, the spring has very little hysteresis, so it is efficient and able to store energy. Furthermore, the spring is powerful and only the inertia of the system limits the rate at which energy can be released. Moreover, a spring by its very nature is compliant and therefore, a spring provides some measure of safety is always available to the system.

Developing wearable robotic systems for human force and performance augmentation requires devices that are portable, lightweight, safe, economical and simple to operate. These demands can be difficult to achieve using traditional direct drive approaches. In a simple example for ankle gait, a DC motor/gearbox combination would require a minimum of 250 W of peak power and consume nearly 36 Joules of energy for each step. The traditional approach weighs 6.6 kg per ankle.

As discussed above, in contrast to the background art, the Jack Spring based actuator of the present invention can do the same job with ⅓ the power, 8 times less weight and consume only ½ the energy required by a direct drive example of the background art. In addition, use of a compliant spring adds a level of inherent safety in its attachment to a human operator. Compliance or give of a spring can help minimize the danger or damage a robotic instrument can do to a user in the case of a mishap. Also, including a low power motor is inherently safe. Lastly, as the demands of the most complicated portions of ankle gait are handled via a spring, a simple and economical position controller scheme is possible.

In another alternative embodiment of the invention, a unique method of actuation can be used by taking the additional step of minimizing the 'reflected' loading. This is in contrast to background art lead screw actuators. In a lead screw actuator, the lead is fixed because the threads are rigid and stiff. A rigid nut is matched to have the exact same lead. In the background art, the reflected load is based on the fixed lead angle, $\alpha$, and cannot be altered. In one embodiment of the invention, the coils of the spring act as the threads in the actuator. More importantly because the coils are compliant, they can be squeezed together at the guide interface. In this case, the lead angle, $\alpha$, is reduced and thus the reflected load is reduced. Since the spacing of the guide and spring coil spacing are not equal, the relationship between torque and translation is decoupled.

Due to the threads, or the screw, of the present invention being a spring coil, a preload on a small portion of the coils of the spring can be performed. For example, in the assembly process, the spring is compressed and then rotated on a set of pins with a reduced spacing. This step of preloading the coils of the spring acts to flatten the spring in the area of the pins (i.e., spring/transmission rod interface discussed above) and minimizes the amount of the reflected load. For this design, the unloaded slope of the spring is approximately a 6° angle. However, with an example preload of 85 lbs, this slope drops to approximately a 2° angle. This change in the angle reduces the motor torque requirements to ⅓ of the unloaded slope system. The preload amount of 85 lbs was calculated to be the threshold of infinite life of the spring, as the preload is designed to occur only over ½ of a spring coil.

Figure 17:
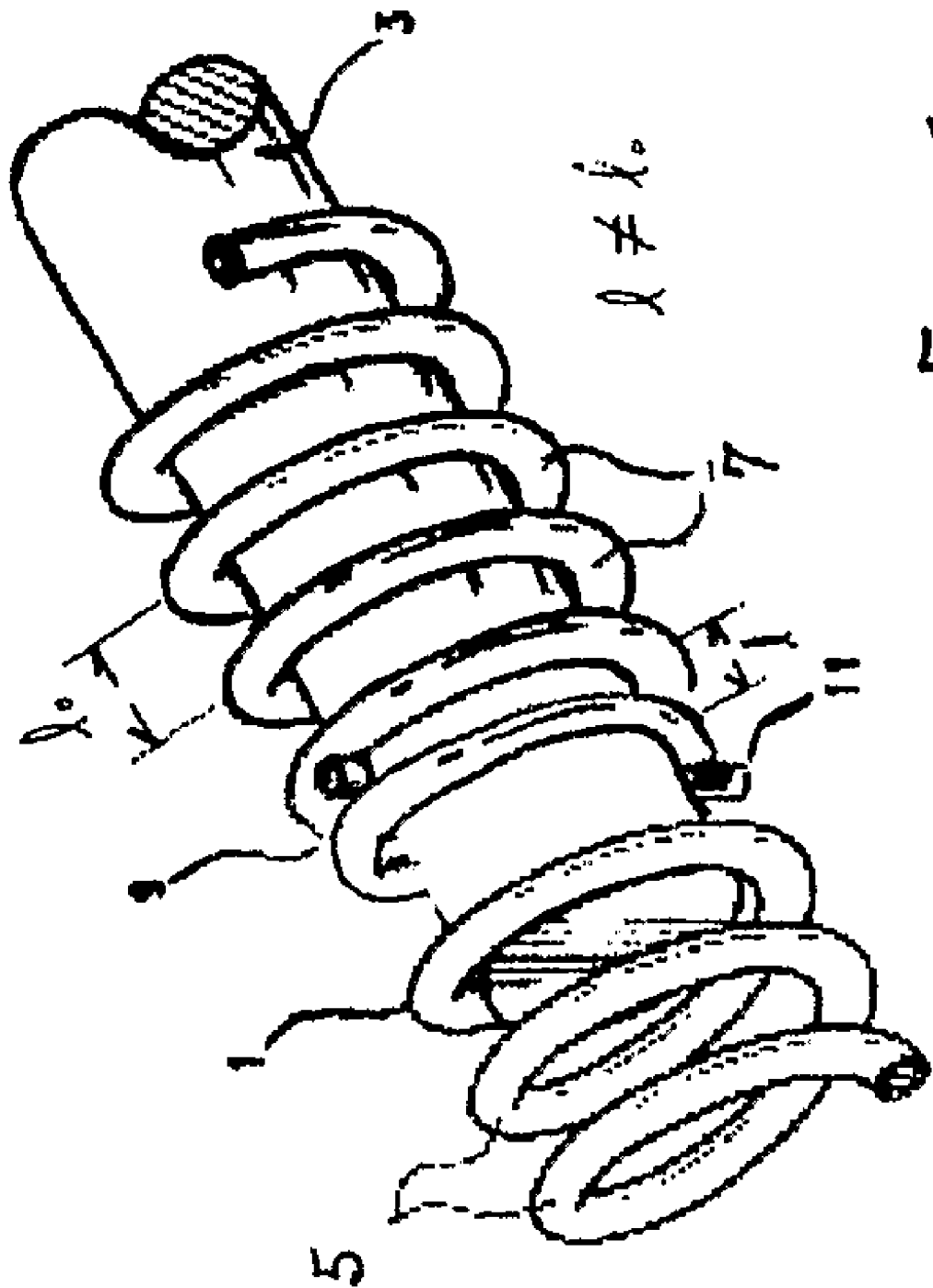
FIG. 17 shows a sketch of the preloading concept that can be used with the present invention.

FIG. 17 shows a sketch of the preloading concept that can be used with the present invention. FIG. 17 shows spring 1 and the pins 9, 11 when applying a pre-load on the spring causing the spring to flatten in the area of the preloading. Note that the lead length of the spring 1 does not have to match the lead length chosen between the two pins 9, 11.

The foregoing description illustrates and describes the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such, or other embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. An actuator operatively coupled to a kinematic joint, the actuator comprising:
    a spring including a plurality of coils;
    a guiding element coupled to the spring, the guiding element divides the coils between active coils and inactive coils, wherein rotation of one of the guiding element and the spring relative to the other increases or decreases an amount of the active coils and causes the spring and guiding element to translate relative to each other;
    a motor, the spring and guiding element being coupled between the motor and the kinematic joint, wherein the motor rotates one of the spring and the guiding element relative to the other and to add energy to or remove energy from the kinematic joint by increasing or decreasing, respectively, energy stored in the active coils of the spring, and
    wherein the guiding element decouples a torque and translation relationship between the guiding element and the spring.

2. The apparatus of claim 1, wherein the spring comprises a curvilinear coiled spring.

3. The apparatus of claim 1, wherein the guiding element extends within the spring.

4. The apparatus of claim 1, wherein the guiding element includes a guide surface having a surface spacing that differs as compared to a coil spacing of the spring.

5. The apparatus of claim 1, wherein the guiding element comprises at least one protuberance extending between the coils of the spring and dividing the spring between active coils and inactive coils.

6. The apparatus of claim 5, wherein the at least one protuberance comprises a pair of pins.

7. The apparatus of claim 6, wherein a dimension of the pins matches spacing between coils of the spring.

8. The apparatus of claim 1, wherein the guiding element is configured to exhibit a duality of self-locking or back-drive behavior with respect to the spring.

9. The apparatus of claim 1, wherein the spring is configured to store energy under at least one of tension, compression, bending, and shear loads.

10. The apparatus of claim 1, wherein rotation of one of the spring and the guiding element changes an axial stiffness of the spring.

11. The apparatus of claim 1, wherein rotation of one of the spring and the guiding element changes a bending stiffness of the spring.

12. The apparatus of claim 1, wherein the motor is configured to rotate the one of the spring and the guiding element to control a position of the kinematic joint.

13. The apparatus of claim 1, wherein the motor is configured to rotate the one of the spring and the guiding element to control a force and/or torque of the kinematic joint.

14. The apparatus of claim 1, wherein the motor is configured to rotate the one of the spring and the guiding element to modulate a stiffness of the kinematic joint.

15. The apparatus of claim 1, used in a wearable actuated system.

16. An actuator operatively coupled to a kinematic joint, the actuator comprising:
    a spring including a plurality of coils;
    a guiding element coupled to the spring, the guiding element divides the coils between active coils and inactive coils, wherein rotation of one of the guiding element and the spring relative to the other increases or decreases an amount of the active coils and causes the spring and guiding element to translate relative to each other;
    a motor, the spring and guiding element being coupled between the motor and the kinematic joint, wherein the motor rotates one of the spring and the guiding element relative to the other and to add energy to or remove energy from the kinematic joint by increasing or decreasing, respectively, energy stored in the active coils of the spring, and
    wherein the guiding element alters a torque and translation relationship between the guiding element and the spring.

* * * * *